United States Patent
Cho et al.

(10) Patent No.: US 10,334,200 B2
(45) Date of Patent: Jun. 25, 2019

(54) WIRELESS DEVICE AND WIRELESS SYSTEM

(71) Applicant: LG ELECTRONICS INC., Seoul (KR)

(72) Inventors: Eunyoung Cho, Seoul (KR); Sangjin Ahn, Seoul (KR); Sanghyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/711,871

(22) Filed: Sep. 21, 2017

(65) Prior Publication Data

US 2018/0098018 A1    Apr. 5, 2018

(30) Foreign Application Priority Data

Oct. 5, 2016   (KR) .................. 10-2016-0128236

(51) Int. Cl.
| | |
|---|---|
| H04N 5/445 | (2011.01) |
| H04N 5/44 | (2011.01) |
| G06F 3/14 | (2006.01) |
| G06T 3/40 | (2006.01) |

(52) U.S. Cl.
CPC ....... *H04N 5/44582* (2013.01); *G06F 3/1454* (2013.01); *H04N 5/4403* (2013.01); *H04N 5/44591* (2013.01); *G06T 3/40* (2013.01); *G09G 2340/045* (2013.01); *G09G 2340/0407* (2013.01); *G09G 2340/0442* (2013.01); *G09G 2340/12* (2013.01); *G09G 2370/16* (2013.01); *H04N 2005/4428* (2013.01)

(58) Field of Classification Search
None
See application file for complete search history.

(56) References Cited

U.S. PATENT DOCUMENTS

| | | | | |
|---|---|---|---|---|
| 5,187,776 | A * | 2/1993 | Yanker | G06F 3/04845 345/660 |
| 5,434,625 | A * | 7/1995 | Willis | H04N 3/223 348/564 |
| 9,001,208 | B2 | 4/2015 | Yasutake | |
| 9,360,997 | B2 | 6/2016 | Missig et al. | |

(Continued)

FOREIGN PATENT DOCUMENTS

WO    2015130026    9/2015

OTHER PUBLICATIONS

PCT International Application No. PCT/KR2016/013867, International Search Report dated Jul. 3, 2017, 3 pages.

*Primary Examiner* — Samira Monshi
(74) *Attorney, Agent, or Firm* — Lee, Hong, Degerman, Kang & Waimey PC

(57) ABSTRACT

A first wireless device that supports a Wi-Fi direct service includes: a display unit configured to display an entire image of content being displayed by a second wireless device; a communication unit configured to perform a connection setup with the second wireless device; and a processor configured to control the display unit and the communication unit. The processor receives a zoom-in request signal for zooming in a partial image included in the entire image and receives data of the entire image and data of a zoomed-in partial image corresponding to the partial image from the second wireless device based on the zoom-in request signal.

15 Claims, 21 Drawing Sheets

(56) References Cited

U.S. PATENT DOCUMENTS

| | | | |
|---|---|---|---|
| 2006/0055693 A1* | 3/2006 | Sylthe | G06T 3/4092 345/419 |
| 2010/0188579 A1* | 7/2010 | Friedman | H04N 5/45 348/565 |
| 2012/0040719 A1* | 2/2012 | Lee | G06F 1/1626 455/557 |
| 2012/0320198 A1 | 12/2012 | Yasutake | |
| 2014/0068520 A1 | 3/2014 | Missig et al. | |
| 2014/0223490 A1 | 8/2014 | Pan et al. | |
| 2015/0061972 A1 | 3/2015 | Seo et al. | |
| 2016/0357987 A1 | 12/2016 | Heo et al. | |
| 2016/0364897 A1 | 12/2016 | Choi et al. | |

\* cited by examiner

FIG. 7A

| Bits  | Index | Interpretation |
|-------|-------|----------------|
| 0     | 0     | 800 x 480 p30  |
| 1     | 1     | 800 x 480 p60  |
| 2     | 2     | 854 x 480 p30  |
| 3     | 3     | 854 x 480 p60  |
| 4     | 4     | 864 x 480 p30  |
| 5     | 5     | 864 x 480 p60  |
| 6     | 6     | 640 x 360 p30  |
| 7     | 7     | 640 x 360 p60  |
| 8     | 8     | 960 x 540 p30  |
| 9     | 9     | 960 x 540 p60  |
| 10    | 10    | 848 x 480 p30  |
| 11    | 11    | 848 x 480 p60  |
| 31:12 | -     | Reserved       |

Table 1 : Supported HH Resolutions/Refresh Rates

FIG. 7B

| Bits | Index | Interpretation |
|---|---|---|
| 0 | 0 | 640 x 480 p60 |
| 1 | 1 | 720 x 480 p60 |
| 2 | 2 | 720 x 480 i60 |
| 3 | 3 | 720 x 576 p50 |
| 4 | 4 | 720 x 576 i50 |
| 5 | 5 | 1280 x 720 p30 |
| 6 | 6 | 1280 x 720 p60 |
| 7 | 7 | 1920 x 1080 p30 |
| 8 | 8 | 1920 x 1080 p60 |
| 9 | 9 | 1920 x 1080 i60 |
| 10 | 10 | 1280 x 720 p25 |
| 11 | 11 | 1280 x 720 p50 |
| 12 | 12 | 1920 x 1080 p25 |
| 13 | 13 | 1920 x 1080 p50 |
| 14 | 14 | 1920 x 1080 i50 |
| 15 | 15 | 1280 x 720 p24 |
| 16 | 16 | 1920 x 1080 p24 |
| 31 : 17 | - | Reserved |

Table 2 : Supported CEA Resolutions/Refresh Rates

FIG. 7C

| Bits | Index | Interpretation |
|---|---|---|
| 0 | 0 | 800 x 600 p30 |
| 1 | 1 | 800 x 600 p60 |
| 2 | 2 | 1024 x 768 p30 |
| 3 | 3 | 1024 x 768 p60 |
| 4 | 4 | 1152 x 864 p30 |
| 5 | 5 | 1152 x 864 p60 |
| 6 | 6 | 1280 x 768 p30 |
| 7 | 7 | 1280 x 768 p60 |
| 8 | 8 | 1280 x 800 p30 |
| 9 | 9 | 1280 x 800 p60 |
| 10 | 10 | 1360 x 768 p30 |
| 11 | 11 | 1360 x 768 p60 |
| 12 | 12 | 1366 x 768 p30 |
| 13 | 13 | 1366 x 768 p60 |
| 14 | 14 | 1280 x 1024 p30 |
| 15 | 15 | 1280 x 1024 p60 |
| 16 | 16 | 1400 x 1050 p30 |
| 17 | 17 | 1400 x 1050 p60 |
| 18 | 18 | 1440 x 900 p30 |
| 19 | 19 | 1440 x 900 p60 |
| 20 | 20 | 1600 x 900 p30 |
| 21 | 21 | 1600 x 900 p60 |
| 22 | 22 | 1600 x 1200 p30 |
| 23 | 23 | 1600 x 1200 p60 |
| 24 | 24 | 1680 x 1024 p30 |
| 25 | 25 | 1680 x 1024 p60 |
| 26 | 26 | 1680 x 1050 p30 |
| 27 | 27 | 1680 x 1050 p60 |
| 28 | 28 | 1920 x 1200 p30 |
| 31 : 17 | - | Reserved |

Table 3 : Supported VESA Resolutions/Refresh Rates

FIG. 7D

| | | |
|---|---|---|
| M3 | request (src->snk) | GET_PARAMETER rtsp://localhost/wfd1.0 RTSP/1.0<br>CSeq: i+1<br>Content-Type: text / parameters<br>Content-Length: 141<br>wfd_video_formats —710<br>wfd_audio_codecs<br>wfd_3d_video_formats<br>wfd_content_protection<br>wfd_display_edid<br>wfd_coupled_sink<br>wfd_client_rtp_ports |
| | response (snk->src) | RTSP / 1.0 200 OK<br>CSeq: i+1<br>Content-Length: 290<br>Content-Type: text / parameters<br>wfd_video_formats: 00 00 01 01 00000001 00000000 00000000 00 0000 0000 00 none none —730<br>wfd_audio_codecs: LPCM 00000003 00<br>wfd_3d_video_formats: none<br>wfd_content_protection: none<br>wfd_display_edid: none<br>wfd_coupled_sink: none<br>wfd_client_rtp_ports: RTP / AVP / UDP ; unicast 1023 0 mode = play |

FIG. 8
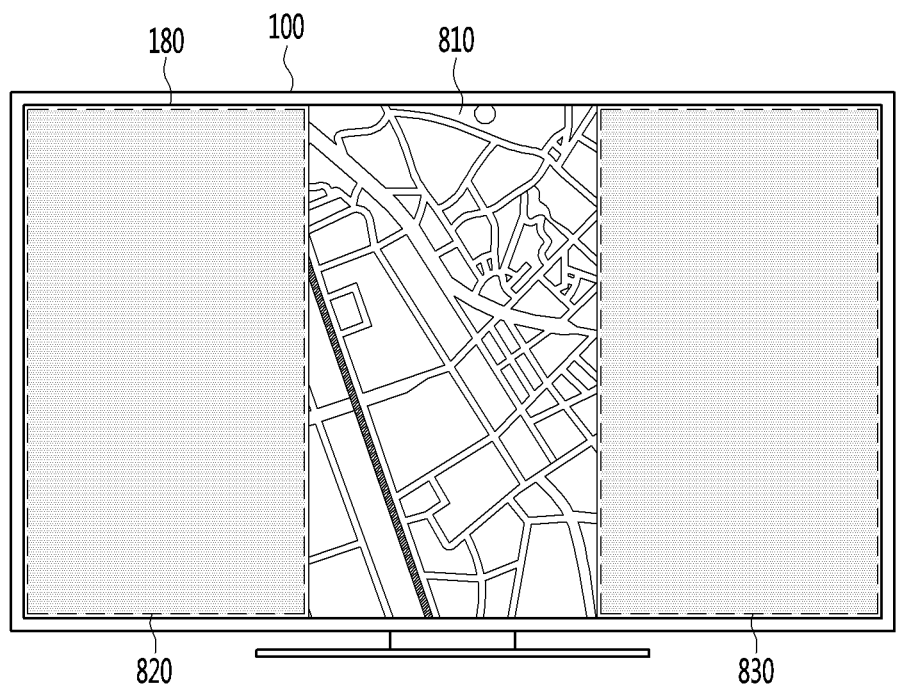
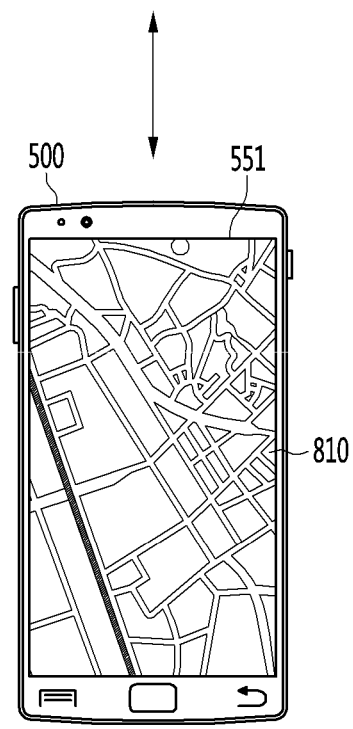

FIG. 12
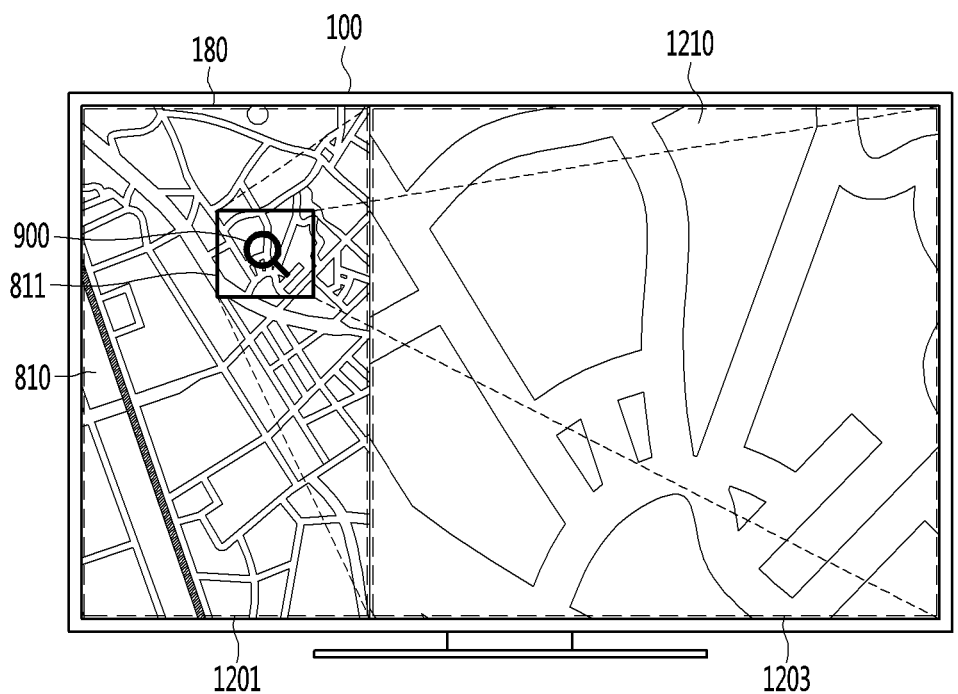
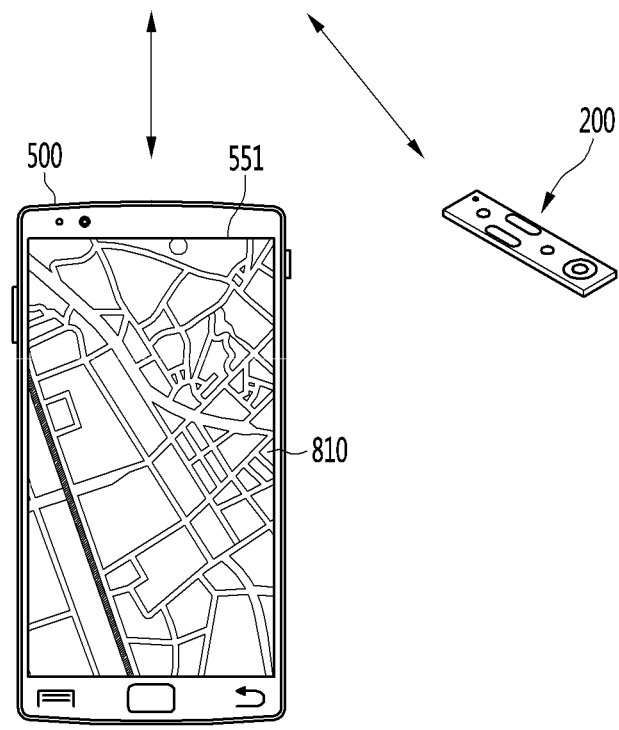

WIRELESS DEVICE AND WIRELESS SYSTEM

CROSS-REFERENCE TO RELATED APPLICATIONS

Pursuant to 35 U.S.C. § 119(a), this application claims the benefit of earlier filing date and right of priority to Korean Patent Application No. 10-2016-0128236, filed on Oct. 5, 2016, the contents of which are hereby incorporated by reference herein in its entirety.

BACKGROUND

The present invention relates to a wireless device and a wireless system, which provide an original image and a zoomed-in partial image of the original image on a single screen during screen mirroring.

With the recent development of information communication technologies, various wireless communication technologies are under development. Among them, a wireless local area network (WLAN) is a technology for wirelessly accessing Internet in homes, businesses, or specific service providing areas based on a wireless frequency technique by using portable terminals such as Personal Digital Assistants (PDAs), laptop computers, and Portable Multimedia Players (PMPs).

As a direct communication technology for allowing devices to be connected to each other easily without an access point (AP) that is required in a WLAN system, the introduction of Wi-Fi Direct or Wi-Fi peer-to-peer (P2P) is discussed. According to a Wi-Fi Direct standard technology, devices are connected without complex setting processes and in order to provide various services to users, data exchanging operations at a communication speed of a typical WLAN system can be supported.

Various Wi-Fi supporting devices have been used recently, and among them, the number of Wi-Fi Direct supporting devices for communication between Wi-Fi devices without requiring APs has been increasing. The Wi-Fi Alliance (WFA) discusses a technology for introducing a platform that supports various services using Wi-Fi Direct link (for example, send, play, display, and print). This can be referred to as Wi-Fi Direct Service (WFDS).

Display service in WFDS is a service for allowing screen sharing between P2P devices. The screen sharing service is also referred to as a screen mirroring technique in that a wireless device displays the same image through image transmission.

However, since the aspect ratio or resolution does not fit during image transmission between P2P devices, an existing screen sharing service includes and delivers an unnecessary image such as a black image (or a letter box) at the top/bottom or left/right. Accordingly, due to an unnecessary image that is displayed in addition to an image displayed by a source device, it is in the way of users watching the image.

Additionally, when an original image displayed on the source device includes a small picture, map, or letter, a user manipulation is difficult due to a small screen of the source device.

Additionally, when an image displayed on the source device is zoomed in, the zoomed-in image can also be displayed on the sink device, but the quality of the image is degraded.

SUMMARY

According to the present invention, when a screen sharing service is provided during WFDS, a part of information displayed on a small screen of a source device is zoomed in on a sink device.

According to the present invention, when the screen sharing service is provided during WFDS, the sink device receives an entire image and a partial zoomed-in image constituting the entire image from the source device by streaming and provides the received entire image and the received partial zoomed-in image.

According to the present invention, when the screen sharing service is provided during WFDS, a partial image of the entire image is zoomed in without degradation in image quality.

According to the present invention, when the screen sharing service is provided during WFDS, a black image inserted due to a mismatched resolution or screen ratio is not displayed.

In one embodiment, a first wireless device that supports a Wi-Fi direct service includes: a display unit configured to display an entire image of content being displayed by a second wireless device; a communication unit configured to perform a connection setup with the second wireless device; and a processor configured to control the display unit and the communication unit, wherein the processor receives a zoom-in request signal for zooming in a partial image included in the entire image and receives data of the entire image and data of a zoomed-in partial image corresponding to the partial image from the second wireless device based on the zoom-in request signal.

In another embodiment, a wireless system which supports a Wi-Fi direct service includes: a first wireless device configured to display an entire image of content being displayed by a second wireless device, receive a zoom-in request signal for zooming in a partial image included in the entire image, and receive data of the entire image and data of a zoomed-in partial image corresponding to the partial image from the second wireless device based on the zoom-in request signal; and the second wireless device configured to display the entire image of the content and transmit the data of the entire image and the data of the zoomed-in partial image to the first wireless device according to a zoom-in request message received from the wireless device.

According to various embodiments of the present invention, when the screen sharing service is provided during the WFD service, a user can more clearly view information, which is difficult to confirm in the source device, on a large screen.

According to various embodiments of the present invention, when the screen sharing service is provided during the WFD service, a user can view a partial image with the same resolution as that of an original image received from the source device.

According to various embodiments of the present invention, when the screen sharing service is provided during the WFD service, a black image inserted due to a mismatched resolution or screen ratio is removed, thereby preventing a user from viewing unnecessary images.

BRIEF DESCRIPTION OF THE DRAWINGS

FIGS. 7A to 7D are tables illustrating resolution information that a WFD sink transmits to a WFD source according to an embodiment of the present invention.

FIGS. 8 to 11 are views illustrating a process of performing a magic zoom function during screen sharing between a WFD source and a WFD sink according to an embodiment of the present invention.

FIGS. 12 to 14 are views illustrating a process of performing a magic zoom function during screen sharing between a WFD source and a WFD sink according to another embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
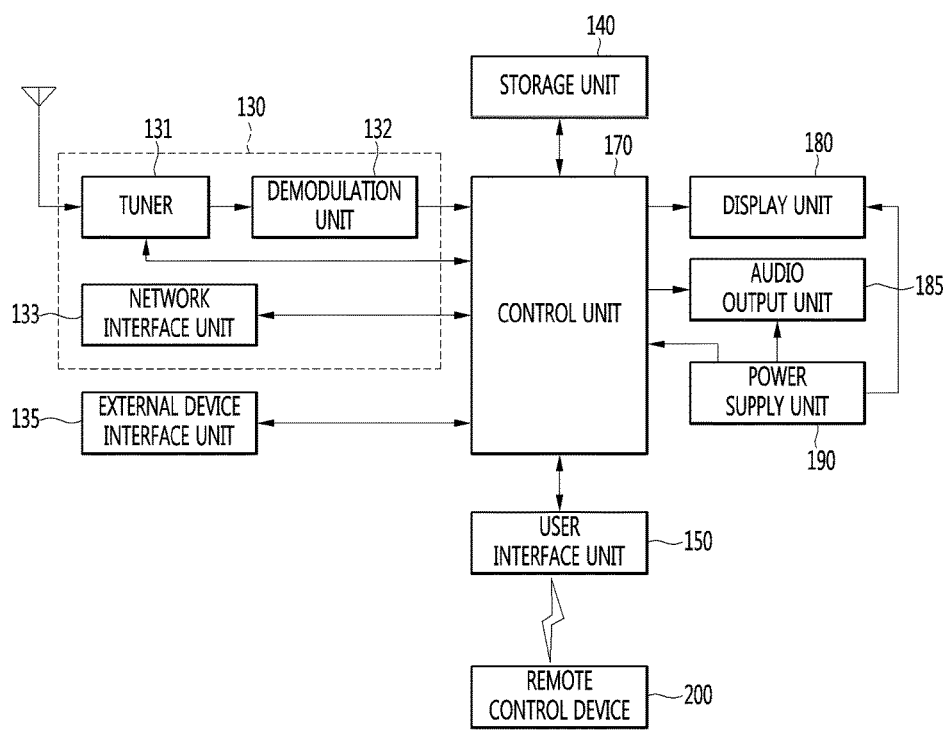
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
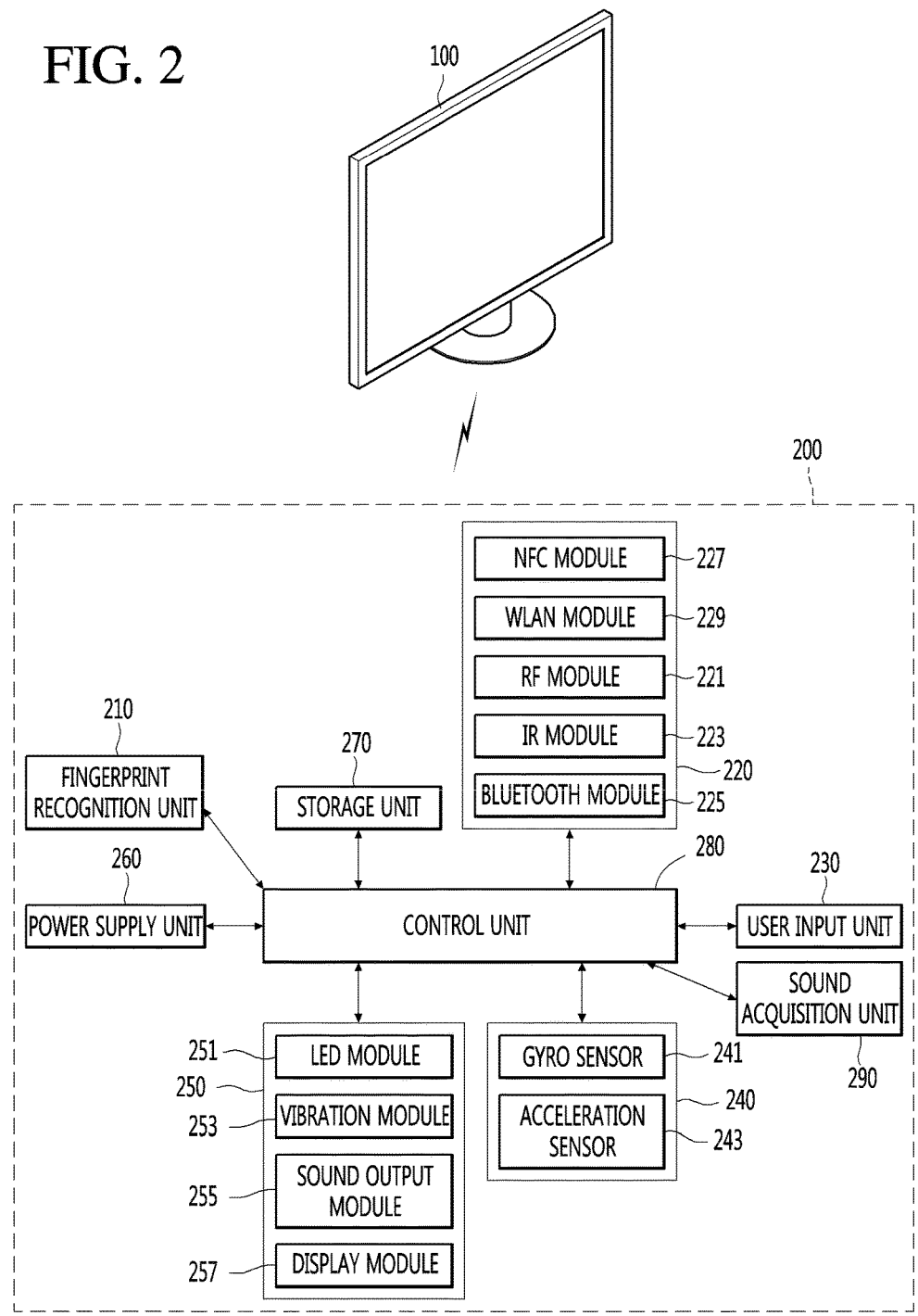
FIG. 2 is a block diagram illustrating a remote control device according to an embodiment of the present invention.
Figure 3:
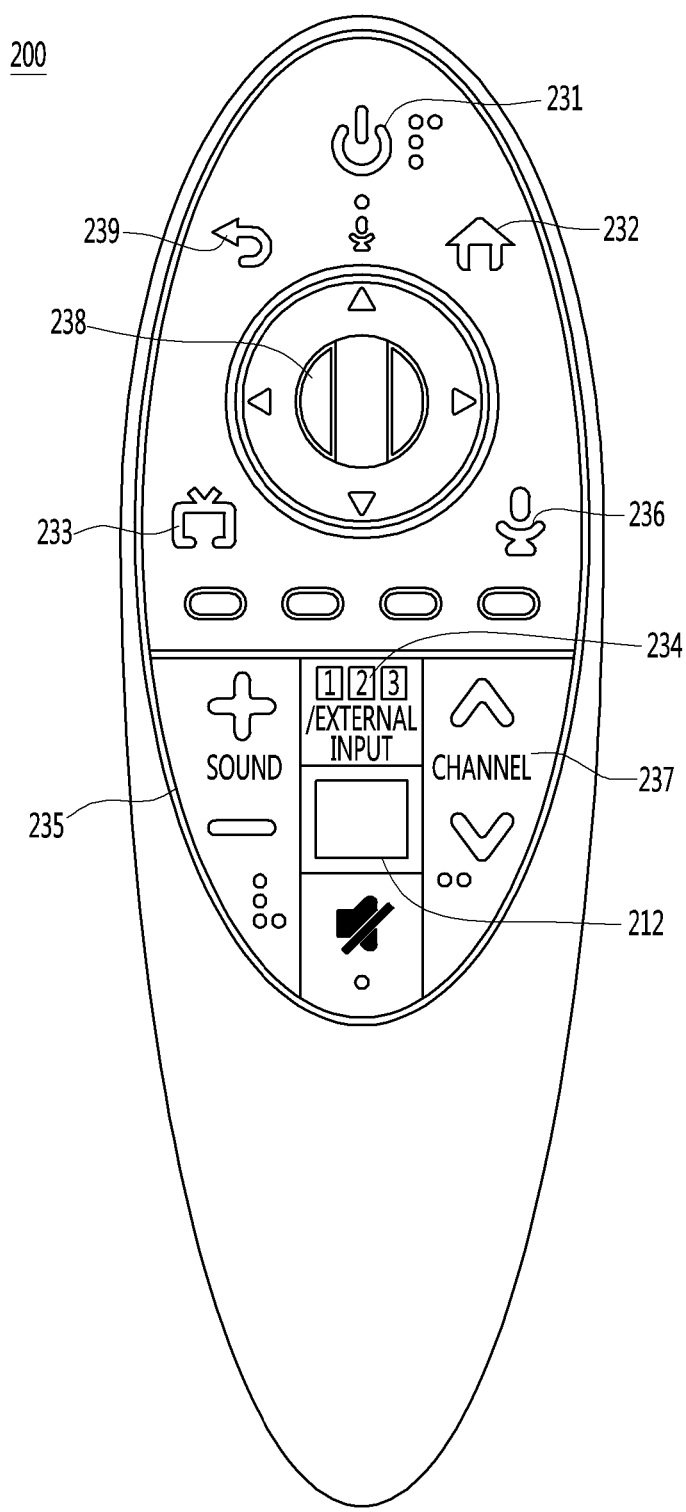
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
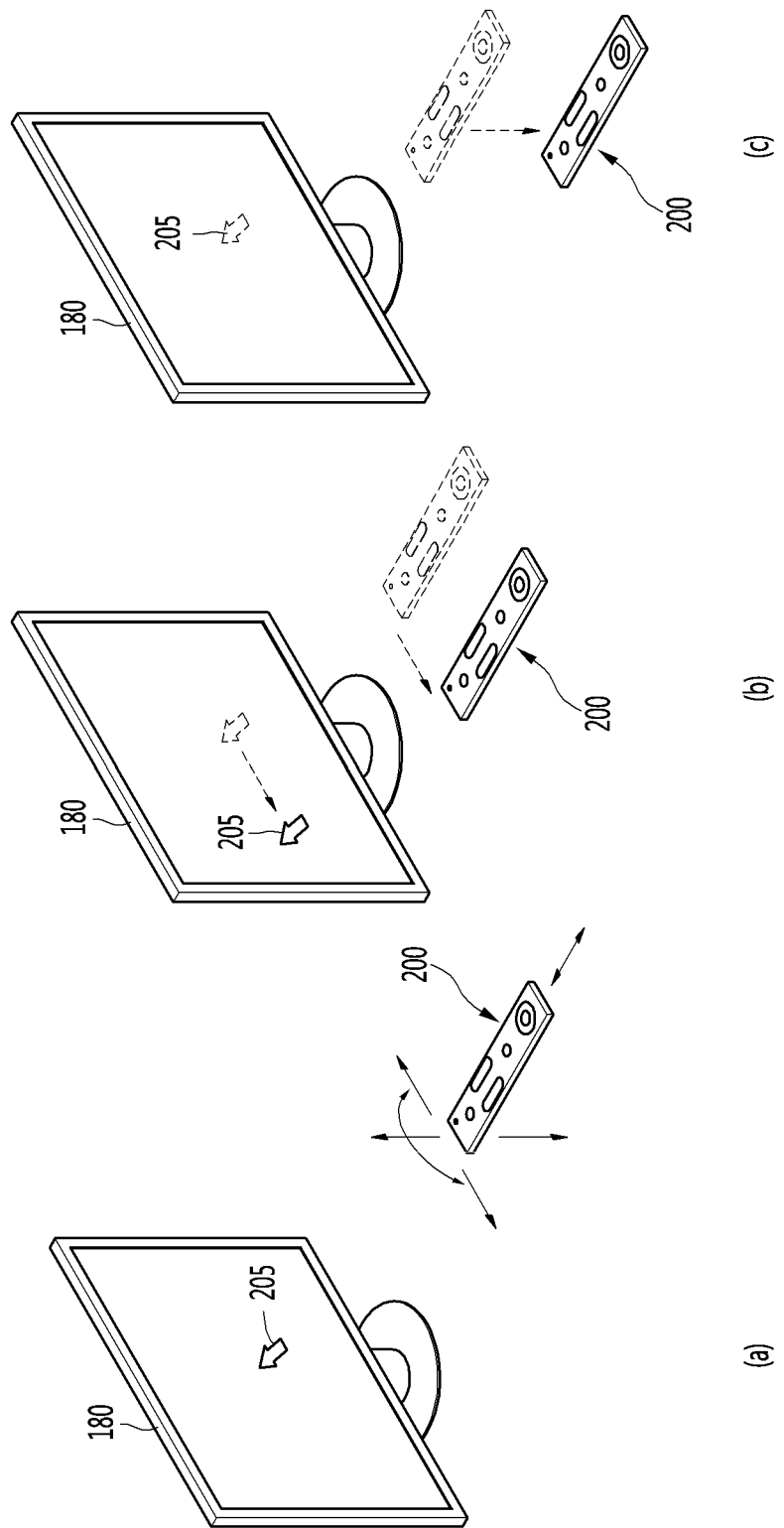
FIG. 4 is a view of utilizing a remote control device according to an embodiment of the present invention.

FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
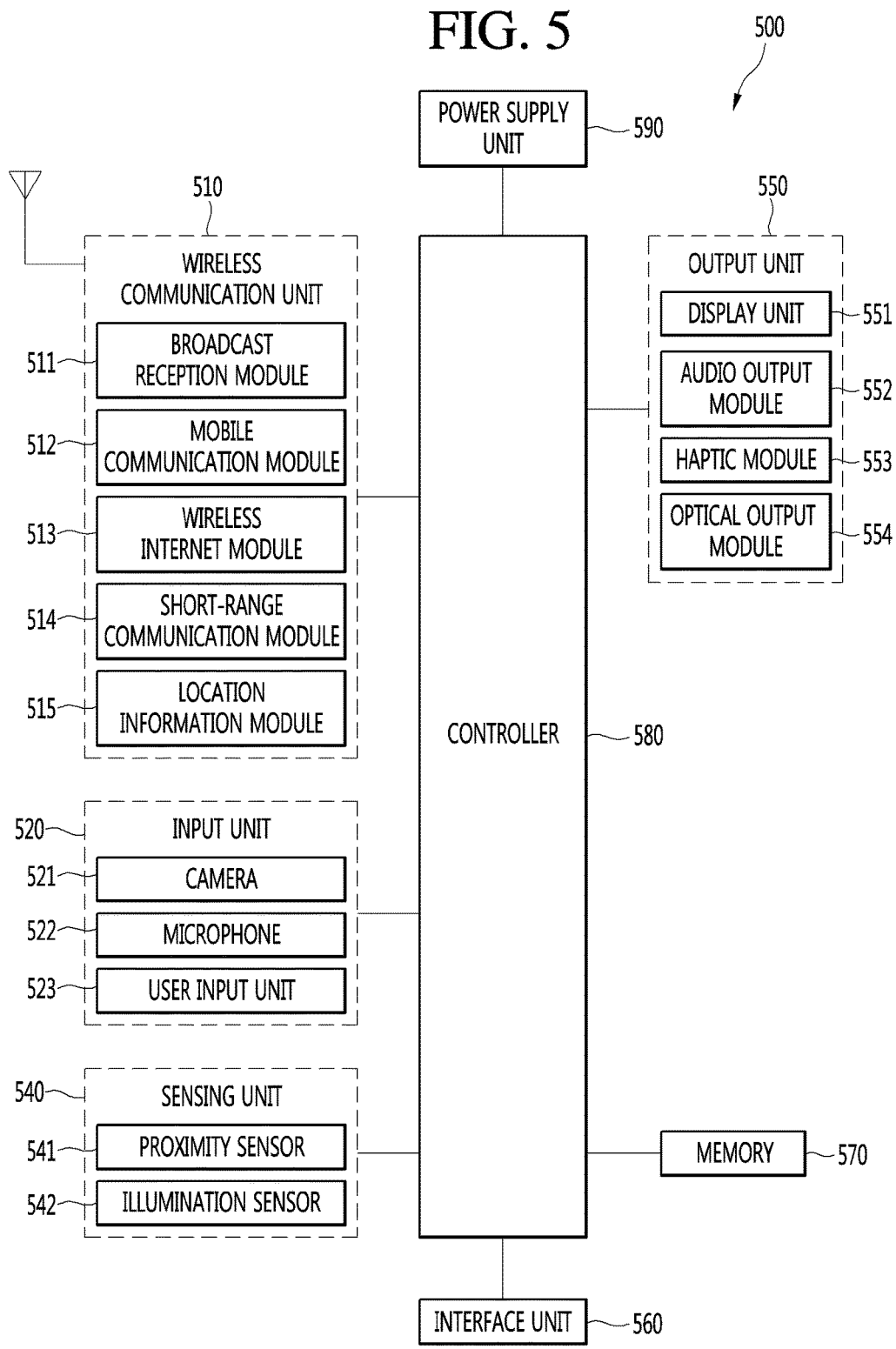
FIG. 5 is a block diagram illustrating a mobile terminal according to an embodiment of the present invention.

Then, a configuration of a mobile terminal according to an embodiment of the present invention will be described with reference to FIG. 5. FIG. 5 is a block diagram illustrating a mobile terminal according to an embodiment of the present invention.

The mobile terminal 500 can include a wireless communication unit 510, an input unit 520, a sensing unit 540, an output unit 550, an interface unit 560, a memory unit 570, a control unit 580, and a power supply unit 590. In implementing a mobile terminal, all components shown in FIG. 5 may not be necessary, so that a mobile terminal described in this specification can include components less or more than the components listed above.

In more detail, the wireless communication unit 510 in the components can include at least one module allowing wireless communication between the mobile terminal 500 and a wireless communication system, between the mobile terminal 500 and another mobile terminal 500, or between the mobile terminal 500 and an external server. Additionally, the wireless communication unit 510 can include at least one module connecting the mobile terminal 500 to at least one network.

The wireless communication unit 510 can include at least one of a broadcast receiving module 511, a mobile communication module 512, a wireless Internet module 513, a short-range communication module 514, and a location information module 515.

The input unit 520 can include a camera 521 or an image input unit for image signal input, a microphone 522 or an audio input unit for receiving audio signal input, and a user input unit 523 (for example, a touch key and a mechanical key) for receiving information from a user. Voice data or image data collected by the input unit 520 are analyzed and processed as a user's control command.

The sensing unit 540 can include at least one sensor for sensing at least one of information in a mobile terminal, environmental information around a mobile terminal, and user information. For example, the sensing unit 540 can include at least one of a proximity sensor 541, an illumination sensor 542, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 521), a microphone (for example, the microphone 522), a battery gauge, an environmental sensor (for example, a barometer, a hygrometer, a thermometer, a radiation sensor, a thermal sensor, and a gas sensor), or a chemical sensor (for example, an electronic noise, a healthcare sensor, and a biometric sensor). Moreover, a mobile terminal disclosed in this specification can combine information sensed by at least two or more sensors among such sensors and utilize it.

The output unit 550 is used to generate a visual, auditory, or haptic output and can include at least one of a display unit 551, a sound output module 552, a haptic module 553, and an optical output unit 554. The display unit 551 can be formed with a mutual layer structure with a touch sensor or formed integrally, so that a touch screen can be implemented. Such a touch screen can serve as the user input unit 523 providing an input interface between the mobile terminal 500 and a user and an output interface between the mobile terminal 500 and a user at the same time.

The interface unit 560 can serve as a path to various kinds of external devices connected to the mobile terminal 500. The interface unit 560 can include at least one of a wired/wireless headset port, an external charger port, a wired/wireless data port, a memory card port, a port connecting a device equipped with an identification module, an audio Input/Output (I/O) port, a video I/O port, or an earphone port. When an external device is connected to the interface unit 560, the mobile terminal 500 can perform an appropriate control relating to the connected external device.

Additionally, the memory unit 570 can store data supporting various functions of the mobile terminal 500. The memory unit 570 can store a plurality of application programs (for example, application programs or applications) running on the mobile terminal 500 and also data and commands for operations of the mobile terminal 500. At least part of such an application program can be downloaded from an external server through wireless communication. Additionally, at least part of such an application program can be included in the mobile terminal 500 from the time of shipment in order to perform a basic function (for example, an incoming call, a transmission function, and a message reception) of the mobile terminal 500. Moreover, an application program can be stored in the memory unit 570 and installed on the mobile terminal 500, so that it can run to perform an operation (or a function) of the mobile terminal 500 by the control unit 580.

The control unit 580 can control overall operations of the mobile terminal 500 generally besides an operation relating to the application program. The control unit 580 can provide appropriate information or functions to a user or process them by processing signals, data, and information input/output through the above components or executing application programs stored in the memory unit 570.

Additionally, in order to execute an application program stored in the memory unit 570, the control unit 580 can control at least part of the components shown in FIG. 5. Furthermore, in order to execute the application program, the control unit 580 can combine at least two of the components in the mobile terminal 500 and operate it.

The power supply unit 590 can receive external power or internal power under a control of the control unit 580 and supply power to each component in the mobile terminal 500. The power supply unit 590 includes a battery and the battery can be a built-in battery or a replaceable battery.

At least part of each component can operate cooperatively in order to implement operations, controls, or control methods of the mobile terminal 500 according to various embodiments of the present invention described below. Additionally, the operations, controls, or control methods of the mobile terminal 500 can be implemented on the mobile terminal 500 by executing at least one application program stored in the memory unit 570.

Hereinafter, prior to examining various embodiments implemented through the mobile terminal 500, the above-listed components are described in more detail with reference to FIG. 5.

First, in describing the wireless communication unit 510, the broadcast receiving module 511 of the wireless communication unit 510 can receive a broadcast signal and/or broadcast related information from an external broadcast management server through a broadcast channel. The broadcast channel can include a satellite channel and a terrestrial channel. At least two broadcast receiving modules for simultaneous broadcast reception for at least two broadcast channels or broadcast channel switching can be provided to the mobile terminal 500.

The mobile communication module 512 can transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal can include various types of data according to a voice call signal, a video call signal, or text/multimedia message transmission.

The wireless Internet module 513 refers to a module for wireless Internet access and can be built in or external to the mobile terminal 500. The wireless Internet module 513 can be configured to transmit/receive a wireless signal in a communication network according to wireless internet technologies.

The wireless Internet technology can include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless Internet module 513 transmits/receives data according to at least one wireless Internet technology including any Internet technologies not listed above.

From the viewpoint that wireless Internet access by WiBro, HSDPA, HSUPA, GSM, CDMA, WCDMA, LTE, and LTE-A is achieved through a mobile communication network, the wireless Internet module 513 performing wireless Internet access through the mobile communication network can be understood as one type of the mobile communication module 512.

The short-range communication module 514 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 514 can support wireless communication between the mobile terminal 500 and a wireless communication system, between the mobile terminal 500 and another mobile terminal 500, or between networks including the mobile terminal 500 and another mobile terminal 500 (or an external server) through wireless area networks. The wireless area networks can be wireless personal area networks.

Here, the other mobile terminal 500 can be a wearable device (for example, a smart watch, a smart glass, and an HMD) that is capable of exchanging data (or interworking) with the mobile terminal 500. The short-range communication module 514 can detect (or recognize) a wearable device around the mobile terminal 500, which is capable of communicating with the mobile terminal 500. Furthermore, if the detected wearable device is a device authenticated to communicate with the mobile terminal 500, the control unit 580 can transmit at least part of data processed in the mobile terminal 500 to the wearable device through the short-range communication module 514. Accordingly, a user of the wearable device can use the data processed in the mobile terminal 500 through the wearable device. For example, according thereto, if a call is received by the mobile terminal 500, a user can perform a phone call through the wearable device or if a message is received by the mobile terminal 500, a user can check the received message.

The location information module 515 is a module for obtaining the location (or the current location) of a mobile terminal and its representative examples include a global positioning system (GPS) module or a Wi-Fi module. For example, the mobile terminal 500 can obtain its position by using a signal transmitted from a GPS satellite through the GPS module. As another example, the mobile terminal 500 can obtain its position on the basis of information of a wireless access point (AP) transmitting/receiving a wireless signal to/from the Wi-Fi module, through the Wi-Fi module. If necessary, the location information module 515 can perform a function of another module in the wireless communication unit 510 in order to obtain data on the location of the mobile terminal substitutionally or additionally. The location information module 515 is a module for obtaining the position (or the current position) of the mobile terminal and is not limited to a module directly calculating and obtaining the position of the mobile terminal.

Then, the input unit 520 is used for inputting image information (or signal), audio information (or signal), data, or information inputted from a user and the mobile terminal 500 can include at least one camera 521 in order for inputting image information. The camera 521 processes image frames such as a still image or a video obtained by an image sensor in a video call mode or a capturing mode. The processed image frame can be displayed on the display unit 551 or stored in the memory unit 570. Moreover, a plurality of cameras 521 equipped in the mobile terminal 500 can be arranged in a matrix structure and through the camera 521 having such a matrix structure, a plurality of image information having various angles or focuses can be input to the input terminal 500. Additionally, the plurality of cameras 521 can be arranged in a stereo structure to obtain the left and right images for implementing a three-dimensional image.

The microphone 522 processes external sound signals as electrical voice data. The processed voice data can be utilized variously according to a function (or an application program being executed) being performed in the mobile terminal 500. Moreover, various noise canceling algorithms for removing noise occurring during the reception of external sound signals can be implemented in the microphone 522.

The user input unit 523 is to receive information from a user and if information is input through the user input unit 523, the control unit 580 can control an operation of the mobile terminal 500 according to the input information. The user input unit 523 can include a mechanical input means (or a mechanical key, for example, a button, a dome switch, a jog wheel, and a jog switch at the front, back or side of the mobile terminal 500) and a touch type input means. As one example, a touch type input means can include a virtual key, a soft key, or a visual key, which is displayed on a touch screen through software processing or can include a touch key disposed at a portion other than the touch screen. Moreover, the virtual key or visual key can have various forms and can be disposed on a touch screen and for example, can include graphic, text, icon, video, or a combination thereof.

Moreover, the sensing unit 540 can sense at least one of information in a mobile terminal, environmental information around a mobile terminal, and user information and can then generate a sensing signal corresponding thereto. On the basis of such a sensing signal, the control unit 580 can control the drive or control of the mobile terminal 500 or can perform data processing, functions, or operations relating to an application program installed in the mobile terminal 500. Representative sensors among various sensors included in the sensing unit 540 will be described in more detail.

First, the proximity sensor 541 refers to a sensor detecting whether there is an object approaching a predetermined detection surface or whether there is an object around by using the strength of an electromagnetic field or infrared, without mechanical contact. The proximity sensor 541 can disposed in an inner area of a mobile terminal surrounded by the touch screen or around the touch screen.

Examples of the proximity sensor 541 can include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 541 can be configured to detect the proximity of an object by changes in an electric field according to the proximity of the object having conductivity. In this case, the touch screen (or a touch sensor) itself can be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch." A position that an object is proximity-touched on the touch screen is a position that the object vertically corresponds to the touch screen if the object is proximity-touched. The proximity sensor 541 can detect a proximity touch and a proximity touch pattern (for example, a proximity touch distance, a proximity touch direction, a proximity touch speed, a proximity touch time, a proximity touch position, and a proximity touch movement state). Moreover, the control unit 580 processes data (for information) corresponding to a proximity touch operation and a proximity touch pattern, detected through the proximity sensor 541, and furthermore, can output visual information corresponding to the processed data on the touch screen. Furthermore, according to whether a touch for the same point on the touch screen is a proximity touch or a contact touch, the control unit 580 can control the mobile terminal 500 to process different operations or data (or information).

The touch sensor detects a touch (or a touch input) applied to the touch screen (or the display unit 551) by using at least one of various touch methods, for example, a resistive film method, a capacitive method, an infrared method, an ultrasonic method, and a magnetic field method.

For example, the touch sensor can be configured to convert a pressure applied to a specific portion of the touch screen or changes in capacitance occurring at a specific portion into electrical input signals. The touch sensor can be configured to detect a position and area that a touch target applying a touch on the touch screen touches the touch sensor, a pressured if touched, and a capacitance if touched.

Here, the touch target, as an object applying a touch on the touch sensor, can be a finger, a touch pen, a stylus pen, or a pointer, for example.

In such a manner, if there is a touch input on the touch sensor, signal(s) corresponding thereto are sent to a touch controller. The touch controller processes the signal(s) and then transmits corresponding data to the control unit 580. Therefore, the control unit 580 can recognize which area of the display unit 551 is touched. Herein, the touch controller can be an additional component separated from the control unit 580 or can be the control unit 580 itself.

Moreover, the control unit 580 can perform different controls or the same control according to types of a touch target touching the touch screen (or a touch key equipped separated from the touch screen). Whether to perform different controls or the same control according to types of a touch target can be determined according to a current operation state of the mobile terminal 500 or an application program in execution.

Moreover, the above-mentioned touch sensor and proximity sensor are provided separately or combined and can thus sense various types of touches, for example, short (or tap) touch, long touch, multi touch, drag touch, flick touch, pinch-in touch, pinch-out touch, swipe touch, and hovering touch for the touch screen.

The ultrasonic sensor can recognize position information of a detection target by using ultrasonic waves. Moreover, the control unit 580 can calculate the position of a wave source through information detected by an optical sensor and a plurality of ultrasonic sensors. The position of the wave source can be calculated by using the property that light is much faster than ultrasonic wave, that is, a time that light reaches an optical signal is much shorter than a time that ultrasonic wave reaches an ultrasonic sensor. In more detail, the position of the wave source can be calculated by using a time difference with a time that ultrasonic wave reaches by using light as a reference signal.

Moreover, the camera 521 described as a configuration of the input unit 520 can include at least one of a camera sensor (for example, CCD and CMOS), a photo sensor (or an image sensor), or a laser sensor.

The camera 521 and the laser sensor can be combined to detect a touch of a detection target for a three-dimensional image. The photo sensor can be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor can calculate the coordinates of a detection target according to the amount of change in light and through this, can obtain the position information of the detection target.

The display unit 551 can display (output) information processed in the mobile terminal 500. For example, the display unit 551 can display execution screen information of an application program running on the mobile terminal 500 or user interface (UI) and graphic user interface (GUI) information according to such execution screen information.

Additionally, the display unit 551 can be configured as a three-dimensional display unit displaying a three-dimensional image.

A three-dimensional display method, for example, a stereoscopic method (a glasses method), an autostereoscopic (no glasses method), a projection method (a holographic method) can be applied to the three-dimensional display unit.

The sound output module 552 can output audio data received from the wireless communication unit 510 or stored in the memory unit 570 in a call signal reception or call mode, a recording mode, a voice recognition mode, or a broadcast reception mode. The sound output module 552 can output a sound signal relating to a function (for example, a call signal reception sound and a message reception sound) performed by the mobile terminal 500. The sound output module 552 can include a receiver, a speaker, and a buzzer.

The haptic module 553 generates various haptic effects that a user can feel. A representative example of a haptic effect that the haptic module 553 generates is vibration. The intensity and pattern of vibration generated by the haptic module 553 can be controlled by a user's selection or a setting of a control unit. For example, the haptic module 553 can synthesize and output different vibrations or output different vibrations sequentially.

The haptic module 553 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 553 can be implemented to deliver a haptic effect through a direct contact and also allow a user to feel a haptic effect through a muscle sense such as a finger or an arm. The haptic module 553 can be more than two according to a configuration aspect of the mobile terminal 500.

The optical output unit 554 outputs a signal for notifying event occurrence by using light of a light source of the mobile terminal 500. An example of an event occurring in the mobile terminal 500 includes message reception, call signal reception, missed calls, alarm, schedule notification, e-mail reception, and information reception through an application.

A signal output from the optical output unit 554 is implemented as a mobile terminal emits single color of multi-color to the front or the back. The signal output can be terminated if a mobile terminal detects user's event confirmation.

The interface unit 560 can serve as a path to all external devices connected to the mobile terminal 500. The interface unit 560 can receive data from an external device, receive power and deliver it to each component in the mobile terminal 500, or transmit data in the mobile terminal 500 to an external device. For example, the interface unit 560 can include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 500, can include a user identity module (UIM), a subscriber identity module (SIM), and a universal subscriber identity module (USIM). A device equipped with an identification module (hereinafter referred to as an identification device) can be manufactured in a smart card form. Accordingly, the identification device can be connected to the terminal 500 through the interface unit 560.

Additionally, if the mobile terminal 500 is connected to an external cradle, the interface unit 560 can become a path through which power of the cradle is supplied to the mobile terminal 500 or a path through which various command signals inputted from the cradle are delivered to the mobile terminal 500 by a user. The various command signals or the power input from the cradle can operate as a signal for recognizing that the mobile terminal 500 is accurately mounted on the cradle.

The memory unit 570 can store a program for an operation of the control unit 580 and can temporarily store input/output data (for example, a phone book, a message, a still image, and a video). The memory unit 570 can store data on various patterns of vibrations and sounds outputted during a touch input on the touch screen.

The memory unit 570 can include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 500 can operate in relation to a web storage performing a storage function of the memory unit 570 on Internet.

Moreover, as mentioned above, the control unit 580 can control operations relating to an application program and overall operations of the mobile terminal 500 in general. For example, if a state of the mobile terminal 500 satisfies set conditions, the control unit 580 can execute or release a lock state limiting an output of a control command of a user for applications.

Additionally, the control unit 580 can perform a control or processing relating to a voice call, data communication, and a video call can perform pattern recognition processing for recognizing handwriting input or drawing input on the touch screen as a text and an image, respectively. Furthermore, the control unit 580 can use at least one or a combination of the above components to perform a control in order to implement various embodiments described below on the mobile terminal 500.

The power supply unit 590 can receive external power or internal power under a control of the control unit 580 and can then supply power necessary for an operation of each component. The power supply unit 590 includes a battery. The battery is a rechargeable built-in battery and can be detachably coupled to a terminal body in order for charging.

Additionally, the power supply unit 590 can include a connection port and the connection port can be configured as one example of the interface unit 560 to which an external charger supplying power for charging of the battery is electrically connected.

As another example, the power supply unit 590 can be configured to charge a battery through a wireless method without using the connection port. In this case, the power supply unit 590 can receive power from an external wireless power transmission device through at least one of an inductive coupling method based on a magnetic induction phenomenon, and a magnetic resonance coupling method based on an electromagnetic resonance phenomenon.

Moreover, various embodiments below can be implemented in a computer or device similar thereto readable medium by using software, hardware, or a combination thereof.

Then, a communication system using the mobile terminal 500 is described according to an embodiment of the present invention.

First, the communication system can use different wireless interfaces and/or physical layers. For example, a wireless interface available to the communication system can include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system can include at least one terminal 500, at least one base station (BS) (it can be referred to as Node B or Evolved Node B), at least one base station controllers (BSCs), and a mobile switching center (MSC). MSC can be configured to be connected to Public Switched Telephone Network (PSTN) and BSCs. BSCs can be connected being paired with a BS through a backhaul line. The backhaul line can be provided according to at least one of E1/T1, ATM, IP, PPP, Frame Relay, HDSL, ADSL, and xDSL. Accordingly, a plurality of BSCs can be included in a CDMA wireless communication system.

Each of a plurality of BSs can include at least one sensor and each sensor can include an omni-directional antenna or an antenna indicating a specific radial direction from a BS. Additionally, each sensor can include at least two antennas in various forms. Each BS can be configured to support a plurality of frequency allocations and each of the plurality of frequency allocations can have a specific spectrum (for example, 1.25 MHz, 5 MHz, and so on).

The intersection of a sector and a frequency allocation can be referred to as a CDMA channel. A BS can be referred to as a Base Station Transceiver Subsystem (BTS). In such a case, one BSC and at least one BS together can be referred to as "BS". A BS can also represent "cell site". Additionally, each of a plurality of sectors for a specific BS can be referred to as a plurality of cell sites.

A Broadcasting Transmitter (BT) transmits broadcast signals to the terminals 500 operating in a system. The broadcast receiving module 511 shown in FIG. 5 is provided in the terminal 500 for receiving broadcast signals transmitted from the BT.

Additionally, GPS can be linked to a CDMA wireless communication system in order to check the location of the mobile terminal 500. Then, a satellite helps obtaining the location of the mobile terminal 500. Useful location information can be obtained by at least one satellite. Herein, the location of the mobile terminal 500 can be traced by using all techniques for tracing the location in addition to GPS tracking technique. Additionally, at least one GPS satellite can be responsible for satellite DMB transmission selectively or additionally.

The location information module 515 in the mobile terminal 500 is for detecting and calculating the position of the mobile terminal and its representative example can include a GPS module and a WiFi module. If necessary, the location information module 515 can perform a function of another module in the wireless communication unit 510 in order to obtain data on the location of the mobile terminal substitutionally or additionally.

The location information module 515 such as a GPS module can calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 515 can speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) can be utilized.

WPS is a technique for tracking the location of the mobile terminal 500 by using a WiFi module in the mobile terminal 500 and a wireless Access Point (AP) for transmitting or receiving wireless signals to or from the WiFi module and can mean a Wireless Local Area Network (WLAN) based location measurement technique using WiFi.

A WiFi location tracking system can include a WiFi location measurement server, a mobile terminal 500, a wireless AP connected to the mobile terminal 500, and a database for storing arbitrary wireless AP information.

The mobile terminal 500 in access to a wireless AP can transmit a location information request message to a WiFi location measurement server.

The WiFi location measurement server extracts information of a wireless AP connected to the mobile terminal 500 on the basis of a location information request message (or signal) of the mobile terminal 500. Information of a wireless AP connected to the mobile terminal 500 can be transmitted to the WiFi location measurement server through the mobile terminal 500 or can be transmitted from a wireless AP to a WiFi location measurement server.

Based on the location information request message of the mobile terminal 500, the extracted information of a wireless AP can be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server can extract wireless AP information corresponding to a wireless AP that the mobile terminal 500 access from a pre-established database by using information of the wireless AP connected to the mobile terminal 500. At this point, information of arbitrary wireless APs stored in the database can information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server can extract only a predetermined number of wireless AP information in high RSSI order.

Then, the WiFi location measurement server can extract (or analyze) the location information of the mobile terminal 500 by using at least one wireless AP information extracted from the database. By comparing the included information and the received wireless AP information, location information of the mobile terminal 500 is extracted (or analyzed).

As a method of extracting (or analyzing) the location information of the mobile terminal 500, a Cell-ID method, a finger-print method, a triangulation method, and a landmark method can be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but if the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) can be used.

The landmark method is a method for measuring the location of a mobile terminal by using a landmark transmitter knowing the location.

In addition to the listed methods, a variety of algorithms can be utilized as methods for extracting (or analyzing) the location information of a mobile terminal.

As the extracted location information of the mobile terminal 500 is transmitted to the mobile terminal 500 through the WiFi location measurement server, the mobile terminal 500 can obtain the location information.

As connected to at least one wireless AP, the mobile terminal 500 can obtain location information. At this point, the number of wireless APs, which are required for obtaining the location information of the mobile terminal 500, can vary according to a wireless communication environment where the mobile terminal 500 is located.

Figure 6:
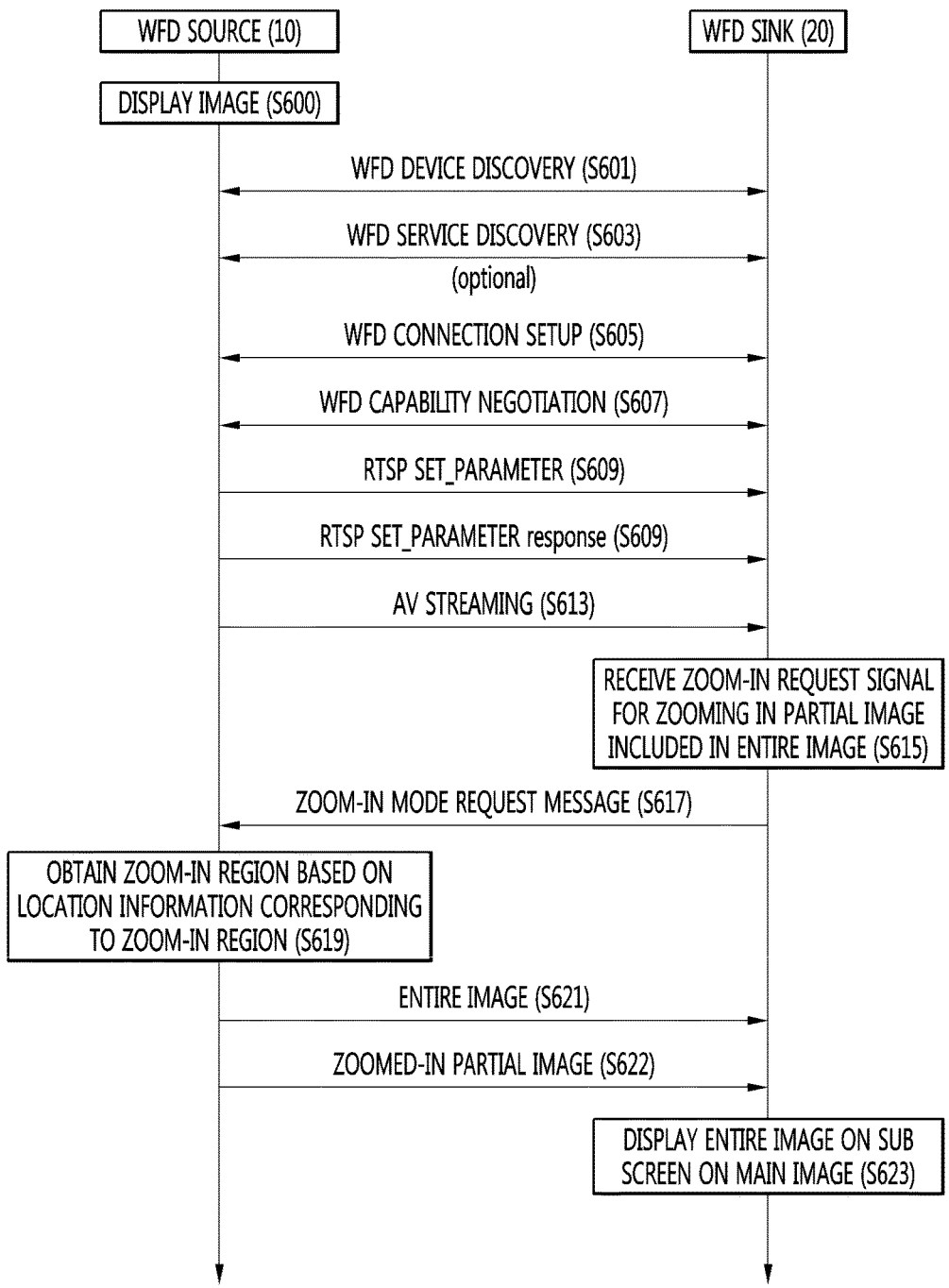
FIG. 6 is a ladder diagram illustrating a process that a WFD session is established between a WFD source and a WFD sink and screen sharing service is provided according to an embodiment of the present invention.

Then, referring to FIG. 6, an example that a WFD session is established between a WFD source and a WFD sink and screen sharing service is provided is described. FIG. 6 is a ladder diagram illustrating a process that a WFD session is established between a WFD source and a WFD sink and a screen sharing service is provided according to an embodiment of the present invention.

At least one of operations shown in FIG. 6 can be supported by one or more Wi-Fi Direct standard documents.

A display service in WFDS can mean service and application for allowing screen sharing between P2P devices. P2P service using display service can be referred to as a WFD device; a device for supporting streaming of multimedia content through a device P2P link among WFD devices can be referred to as a WFD source; and a device for receiving multimedia content from a WFD source device through a P2P link and rendering it can be referred to as a WFD sink.

The WFD source 10 can be the mobile terminal 500 shown in FIG. 5. Accordingly, the WFD source 10 can include all the components of the mobile terminal 500 shown in FIG. 5.

The WFD sink 20 can be the display device 100 shown in FIG. 1. Accordingly, the WFD sink 20 can include all the components of the mobile terminal 500 shown in FIG. 1.

According to an embodiment, an image displayed on a screen can be an image of multimedia content.

According to another embodiment, if the WFD source 10 is the mobile terminal 500 shown in FIG. 5, an image displayed on the screen can be an image being displayed by the mobile terminal 500, for example, the home screen of the mobile terminal 500 or the execution screen of an application installed on the mobile terminal 500 or a video of a media content.

Then, the WFD source 10 and the WFD sink 20 can first discover the presence of each other before a WFD connection setup through WFD device discovery (S601). In more detail, WFD devices can recognize the presence of each other through a probe request frame including WFD information element (IE) and a probe reply frame. The WFD IE can include base information for establishing an optimized connection between WFD devices, for example, a device type and a device state. If a WFD device receives a probe request frame including a WFD IE, in response to this, the WFD device can transmit a probe reply frame including its WFD IE. If a WFD device is linked to an AP and operates as a Wi-Fi P2P device, more than two Wi-Fi transceivers operate logically in one physical device. At this pint, in order for WFD device discovery, a Wi-Fi Direct transceiver is used. A probe request frame for WFD device discovery can include a P2P IE in addition to a WFD IE and they can be decoded by a Wi-Fi Direct transceiver.

Then, the WFD source 10 and the WFD sink 20 can discover the service capability of each other before a WFD connection setup (S603). In more detail, if one WFD device transmits a service discovery request frame where WFD capability is included as information sub element, in response to this, another WFD device can transmit a service discovery reply frame where its WFD capability is included as an information sub element. In relation to a service discovery procedure, a WFD device for supporting a service discovery procedure as a selective procedure can perform a service discovery procedure with a discovered WFD device for supporting a service discovery procedure. In order to perform a service discovery procedure, a probe request frame and reply frame used for a device discovery procedure can include information for indicating whether a WFD device has a capability for supporting a service discovery procedure.

Then, the WFD source 10 or the WFD sink 20 can select a peer WFD device for a WFD connection setup. A peer WFD device for processing a WFD connection setup can be selected by a user's input or a peer WFD device for processing a WFD connection setup can be automatically selected according to a policy.

Then, the WFD device can select a method for a WFD connection setup with the selected peer WFD device in operation S605. In more detail, a WFD device can establish a WFD connection through a Connectivity Scheme of one of Wi-Fi P2P and Tunneled Direct Link Setup (TDLS). The WFD devices can determine a Connectivity Scheme based on Preferred Connectivity information and a linked BSSID sub element delivered in addition to a WFD IE.

If a WFD setup is performed successfully by using Wi-Fi P2P or TDLS between WFD devices, a WFD device can process WFD capability negotiation in operation S607. In more detail, the WFD source 10 and the WFD sink 20 can exchange a message by using the Real-Time Streaming Protocol (RTSP) to determine a parameter set for defining an audio/video payload during a WFD session. The WFD source 10 and the WFD sink 20 can exchange their specification information. The WFD source 10 can inquire the capability of the WFD sink 20 by using the RTSP protocol and in response to this, the WFD sink 20 can transmit its capability information to the WFD source 10. For example, the WFD sink 20 can transmit resolution information including its supportable resolutions to the WFD source 10. For example, the WFD sink 20 can transmit resolution information that its supportable resolution includes a resolution corresponding to a 16:9 or 4:3 aspect ratio to the WFD source 10. Herein, a resolution corresponding to 16:9 or 4:3 is just one example, and can be a resolution corresponding to an aspect ratio that a horizontal length is longer than a vertical length.

On the other hand, the WFD source 10 can also transmit resolution information including its supportable resolutions to the WFD sink 20.

FIGS. 7A to 7D are views illustrating resolution information that a WFD sink transmits to a WFD source according to an embodiment of the present invention.

The WFD sink 20 can transmit at least one of resolution tables shown in FIGS. 7A to 7D to the WFD source 10. That is, the WFD sink 20 can transmit a resolution corresponding to a 16:9 or 4:3 aspect ratio and a resolution corresponding to an aspect ratio that a horizontal length is longer than a vertical length to the WFD source 10.

The resolution table shown in FIG. 7A can be a table for representing a set of resolutions supported by a handheld device that a WFD device supports and a refresh rate corresponding to a resolution.

The resolution table shown in FIG. 7B can be a table for representing a set of Consumer Electronics Association (CEA) resolutions supported by a WFD device and a refresh rate corresponding to a resolution.

The resolution table shown in FIG. 7C can be a table for representing a set of Video Electronics Standards Association (VESA) resolutions supported by a WFD device and a refresh rate corresponding to a resolution.

FIG. 7D is a view illustrating a message that a WFD source inquires the capability of a WFD sink and a WFD sink includes its capability information in correspondence thereto.

After performing a connection setup with the WFD sink 20, the WFD source 10 can transmit a request message M3 for inquiring the capability of the WFD sink 20 by using the RTSP protocol. Referring to FIG. 7D, the WFD source 10 can transmit a request message including a wfd-video-formats parameter 730 to the WFD sink 20. The wfd-video-formats parameter 730 can be a parameter that the WFD sink 20 inquires a supportable video resolution. In response to the request message received from the WFD source 10, the WFD sink 20 can transmit a request message M3 including the resolution information shown in FIGS. 7A to 7D to the WFD source 10. The resolution information can include resolution tables shown in FIGS. 7A to 7C. This can be checked through a value of the video format parameter 730 in the replay message.

Again, FIG. 6 is described.

During a WFD capability negotiation process with the WFD sink 20, the WFD source 10 can transmit a necessary request message to the WFD sink 20 by using the RTSP protocol. For example, the WFD source 10 can transmit, to the WFD sink 20 by using the RTSP protocol, a message including content that an image of a video content corresponding to a specific resolution is to be delivered based on resolution information received from the WFD sink 20. In more detail, the WFD source 10 can transmit, to the WFD sink 20 by using the RTSP protocol, a message including content that an image of a video content corresponding to a specific resolution is to be delivered based on resolution information received from the WFD sink 20. That is, the WFD source 10 can select one of a plurality of resolutions included in resolution information shown in FIGS. 7A to 7D, and transmit a message for representing that an image of the selected resolution is to be transmitted to the WFD sink 20.

As described later, a resolution that the WFD source 10 selects can not correspond to the resolution of an image that the WFD source 10 displays currently.

The WFD sink 20 can transmit a reply message through the RTSP protocol on the basis of a request message received from the WFD source 10 in operation S611.

According to an embodiment of the present invention, a resolution that the WFD source 10 selects cannot be included in resolutions that the WFD source 10 supports. That is, a resolution that the WFD source 10 displays currently cannot be included in resolutions that the WFD sink 20 supports. Operation S609 and operation S611 can be included in operation S607 for WFD capability negotiation.

If the WFD capability negotiation operation is terminated successfully, a WFD session (or a Mira multicast session) is established between the WFD source 10 and the WFD sink 20, and audio and video contents can be streamed from the WFD source 10 to the WFD sink 20 in operation S613.

According to an embodiment, the WFD sink 20 may display the entire image of the streamed video contents.

In the following description, it is assumed that the WFD source 11 may be the mobile terminal 500 described with reference to FIG. 5 and the WFD sink 20 may be the display device 100 described with reference to FIG. 1.

Accordingly, the WFD source 10 may include the entire components of the mobile terminal 500 shown in FIG. 5. Similarly, the WFD sink 20 may include all the components of the display device 100 shown in FIG. 1.

While the audio and video contents are streamed, the WFD sink 20 receives a zoom-in request signal for zooming in a partial image included in the entire image of the video content in operation S615.

According to an embodiment, the zoom-in request signal may be a signal for zooming in a partial image included in the entire image of the video content while being displayed on the display unit 180 of the WFD sink 20.

That is, the zoom-in request signal may be a signal for zooming in a specific region around a certain point of the entire image of the video content. The certain point may be a point where a pointer movable by the remote control device is located.

According to an embodiment, the WFD sink 20 may receive the zoom-in request signal from the remote control device 200. When a button provided in the remote control device 200 is selected, the remote control device 200 may transmit the zoom-in request signal to the WFD sink 20.

The function of the WFD sink 20 for zooming in a partial image of the entire image may be referred to as a magic zoom function, but the magic zoom function is merely an example.

According to an embodiment, when a magic zoom function button provided in the remote control device 200 is selected, the display device 100 may receive the zoom-in request signal from the remote control device 200.

The WFD sink 20 transmits a zoom-in mode request message to the WFD source 10 in response to the received zoom-in request signal in operation S617.

According to an embodiment, the zoom-in mode request message may be a message indicating that the WFD sink 20 is performing the magic zoom function.

The zoom-in mode request message may be a message that requests an additional transmission of a zoomed-in image of a partial image corresponding to a location of a pointer. Specifically, the zoom-in mode request message may be a message that requests a transmission of a zoomed-in image of a partial image corresponding to a point where the pointer is located at a time point when the zoom-in request signal is received from the remote control device 200.

The zoom-in mode request message may be a message that requests an additional transmission of the zoomed-in image of the partial image corresponding to the location of the pointer when the WFD sink 20 performs the magic zoom function.

That is, the zoom-in mode request message may be a message that requests a transmission of the entire image of the video content and the zoomed-in image of the partial image corresponding to the location of the pointer within the entire image.

The zoom-in mode request message may include location information identifying the zoom-in region in the entire image. The location information of the zoom-in region may include coordinates of the pointer and coordinates of the zoom-in region around the pointer. The location information of the zoom-in region will be described below.

According to an embodiment, the WFD sink 20 may transmit the zoom-in mode request message to the WFD source 10 through a user input back channel (UIBC).

The zoom-in mode request message may include a flag indicating that the WFD sink 20 is performing the magic zoom function.

The WFD source 10 obtains the zoom-in region within the displayed entire image of the video content based on the location information corresponding to the zoom-in region included in the zoom-in mode request message received from the WFD sink 20 in operation S619.

According to an embodiment, the WFD source 10 may obtain the zoom-in region to be zoomed in within the entire image, based on one or more of the coordinates of the pointer included in the position information corresponding to the zoom-in region and the coordinates of the zoom-in region.

The WFD source 10 transmits, to the WFD sink 20, data of the entire image of the video content and data of the zoomed-in partial image corresponding to the obtained zoom-in region in operations S621 and S622.

That is, the WFD source 10 may transmit, to the WFD sink 20, the data of the entire image of the video content and the data of the zoomed-in partial image corresponding to the obtained zoom-in region at the same time in operations S621 and S622.

The WFD source 10 may transmit the data of the entire image of the video convent and the data of the zoomed-in partial image to the WFD sink 20 through different channels.

According to an embodiment, the WFD source 10 may transmit the data of the entire image of the video convent and the data of the zoomed-in partial image to the WFD sink 20 by using a Real-Time Streaming Protocol (RTSP) protocol.

The WFD sink 20 displays the entire image based on the received entire image data on a sub screen of the display unit and displays the zoomed-in partial image based on the data of the zoomed-in partial image on a main screen of the display unit in operation S623.

According to an embodiment, the main screen and the sub screen of the display unit may be changed according to a size.

For example, the size of the main screen of the display unit of the WFD sink 20 may be larger than the size of the sub screen thereof.

The WFD sink 20 may move the entire image of the video content to a location where a letter box is displayed. The WFD sink 20 may move the entire image of the video content to a location where a letter box is displayed.

Hereinafter, operations S600 to S623 will be described in detail.

Before describing operations S600 to S623, an example of performing a magic zoom function during screen sharing between the WFD source 10 and the WFD sink 20 will be described.

FIGS. 8 to 11 are views illustrating a process of performing a magic zoom function during screen sharing between a WFD source and a WFD sink according to an embodiment of the present invention.

Hereinafter, it is assumed that the WFD source 10 is the mobile terminal 500 and the WFD sink 20 is the display device 100.

Additionally, it is assumed that the mobile terminal 500 is in a portrait mode. The portrait mode may be a mode in which the mobile terminal 500 is disposed so that a vertical length is longer than a horizontal length. A mode opposite to the portrait mode is a landscape mode.

The portrait mode may be referred to as a vertical mode, and the landscape mode may be referred to as a horizontal mode.

Referring to FIG. 8, the mobile terminal 500 may transmit an entire image 810 of content being displayed on the display unit 551 to the display device through a smart mirroring function.

The display device 100 may display the entire image 810 of the content received from the mobile terminal 500 on the display unit 180. The display device 100 may further display better boxes 820 and 830 on both sides of the entire image 810 while displaying the entire image 810.

That is, the first letter box 820 may be displayed on a left side of the entire image 810, and the second letter box 830 may be displayed on a right side of the entire image 810.

Each of the letter boxes 820 and 830 may be an image inserted due to a mismatching between a screen ratio of the display device 100 and a screen ratio of the mobile terminal 500.

Figure 9:
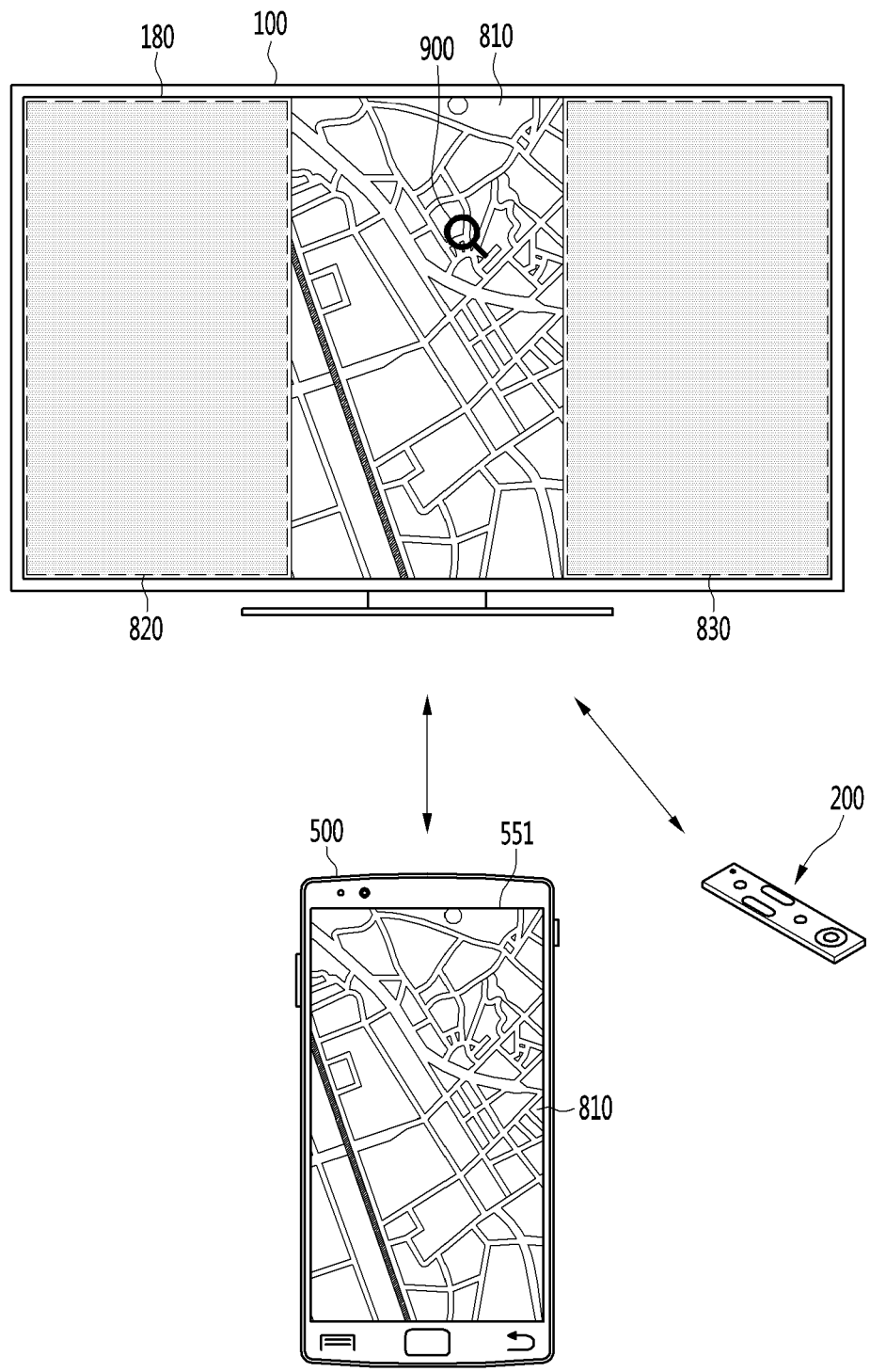

Referring to FIG. 9, a pointer 900 moving according to the movement of the remote control device 200 may be displayed on the display unit 180 of the display device 100.

The display device 100 may receive a zoom-in request signal from the remote control device 200. The zoom-in request signal may be a request for zooming in a partial image within the entire image 819 with respect to the pointer 900.

The display device 100 may change a shape of the pointer 900 in response to the zoom-in request signal. The changed pointer 900 may have a magnifier shape.

Figure 10:
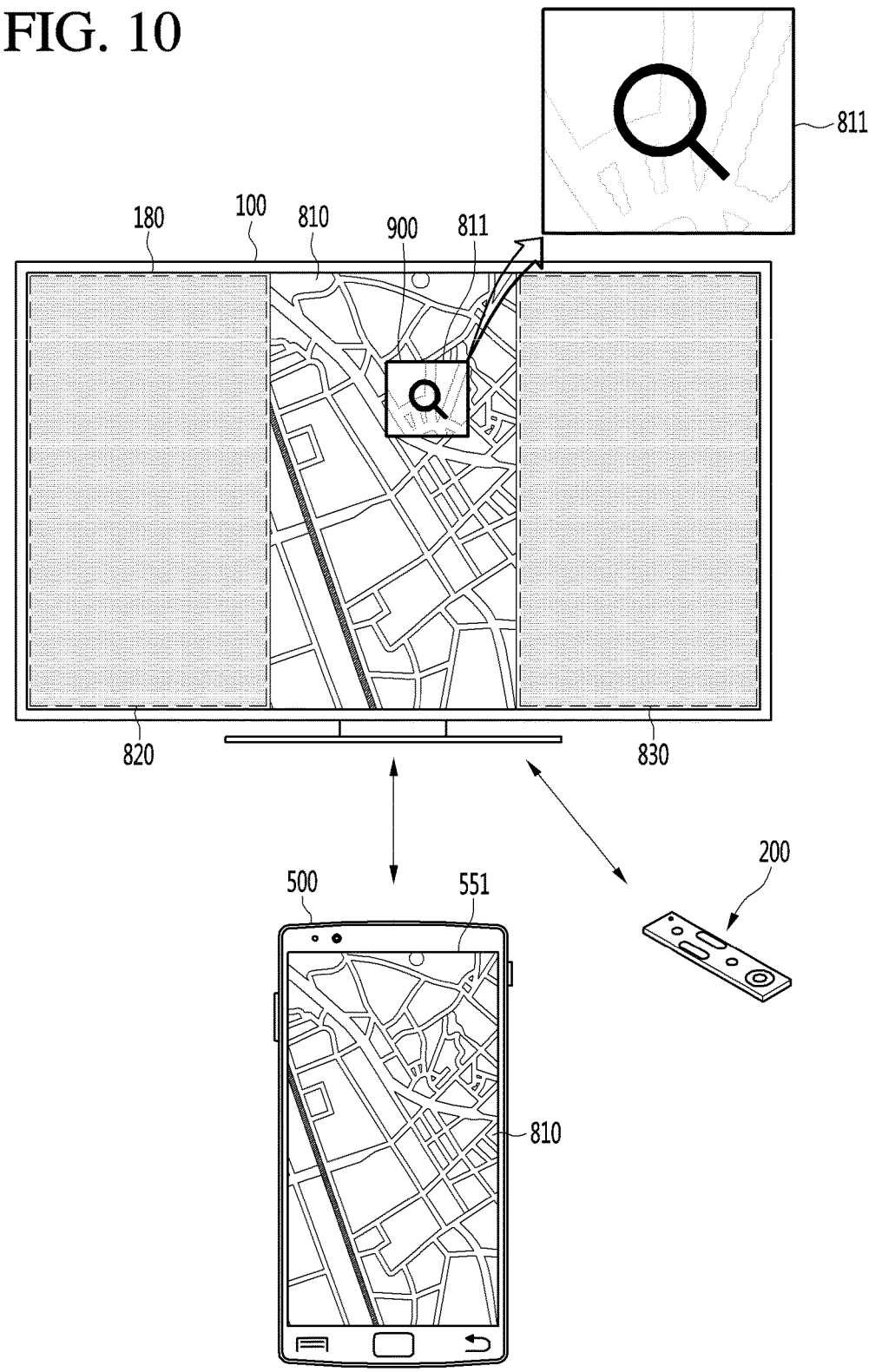

The display device 100 may zoom in a partial image 811 included in the entire image 810 with respect to the pointer 900 as shown in FIG. 10.

In this case, after a scaling process is performed on a partial image of an original image, a boundary of the zoomed-in partial image 811 may be blurredly displayed. The scaling process may be performed through a weighted sum of squares.

That is, the display device 100 may perform interpolation on original pixel data of a partial image before zoom-in and then generate surrounding pixel data. However, in this process, a boundary of the zoomed-in partial image may be blurred.

Figure 11:
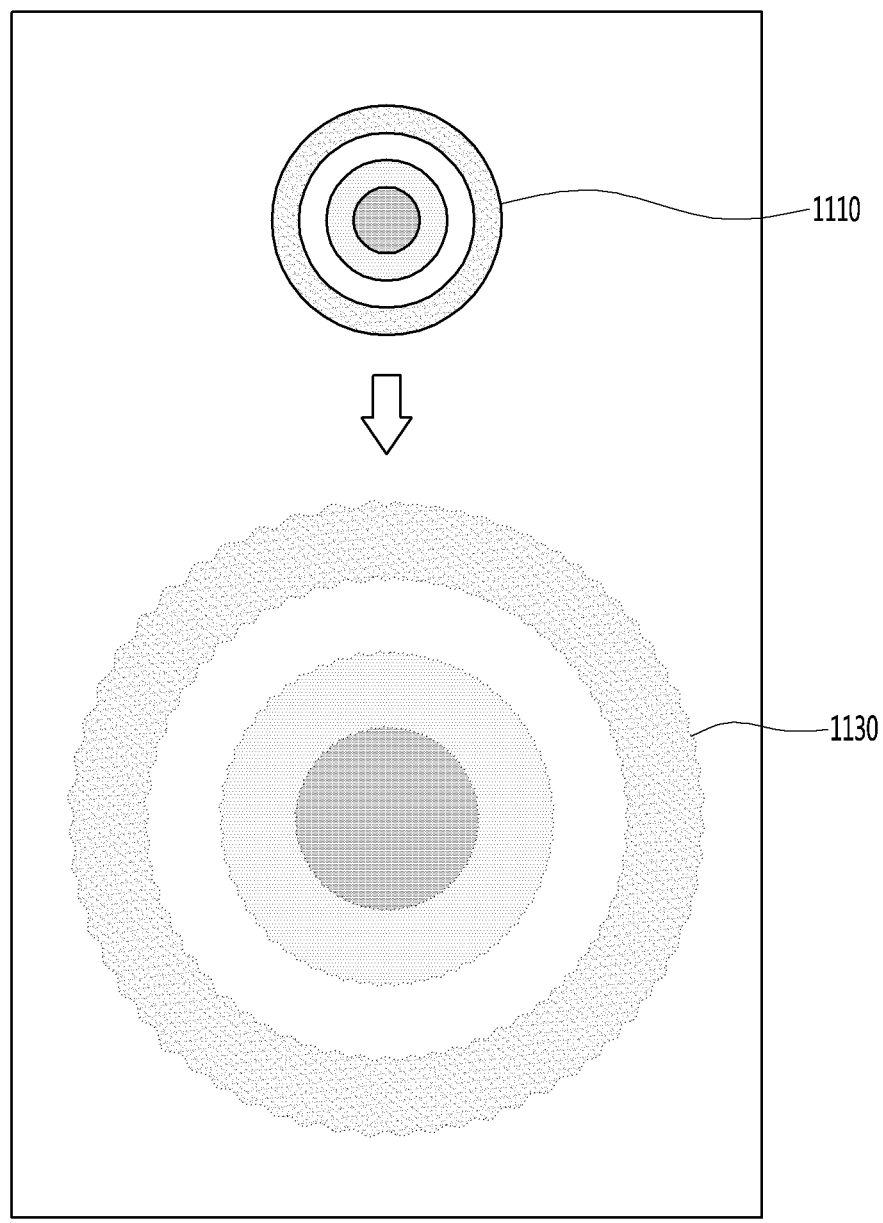

Referring to FIG. 11, a zoomed-in partial image 1130 generated by zooming in an original partial image 1110 according to a zoom-in request signal is illustrated. As such, as compared to the original partial image 1110, a boundary of each circle constituting the zoom-in partial image 1130 is blurred, and thus, an image having clear image quality cannot be provided.

Consequently, a resolution of the zoomed-in partial image 1130 is lower than a resolution of the original partial image 1100, resulting in a degradation of image quality.

In this regard, according to another embodiment of the present invention, in order to maintain a result of an original image even when a partial image is zoomed in, the WFD sink 20 may receive a zoomed-in partial image at the same time as reception of an entire image from the WFD source 10.

Figure 13:
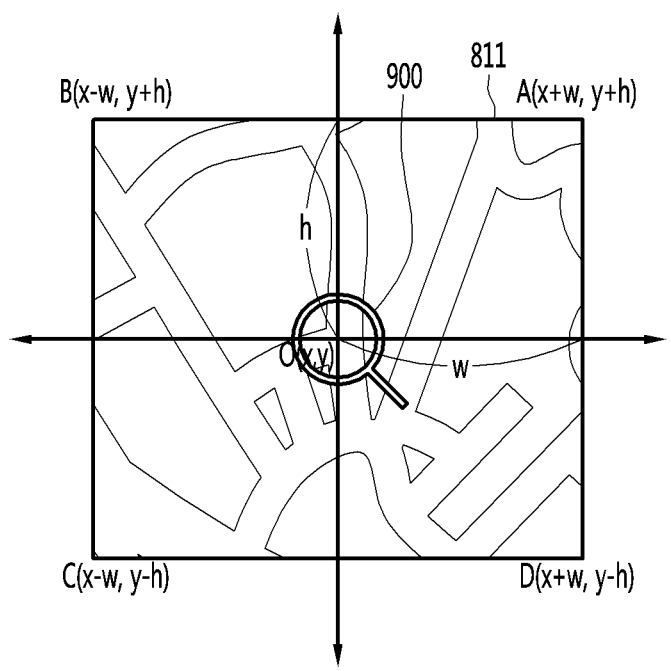
Figure 14:
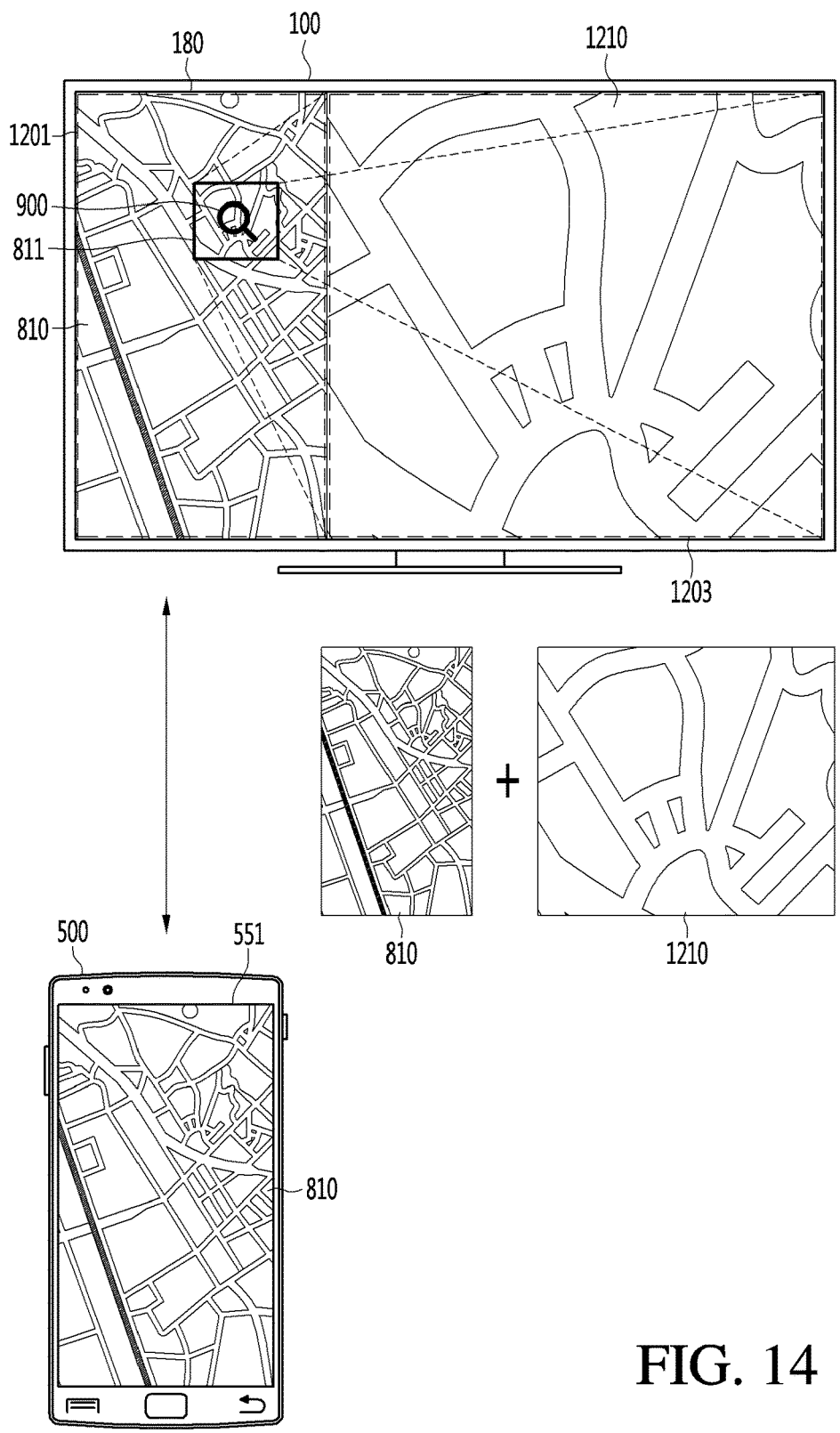

FIGS. 12 to 14 are views illustrating a process of performing a magic zoom function during screen sharing between a WFD source and a WFD sink according to another embodiment of the present invention.

In particular, FIGS. 12 and 14 are an embodiment in which the mobile terminal 500 is in a portrait mode (vertical mode).

FIG. 12 may be an embodiment that is performed after the embodiment of FIG. 9.

That is, in the state of FIG. 9, when the display device 100 receives a zoom-in request signal from the remote control device 200, the display device 100 may transmit a zoom-in mode request message to the mobile terminal 500.

The mobile terminal 500 may obtain a partial image corresponding to a region to be zoomed in within an entire image 810, based on the zoom-in mode request message received from the display device 100.

The mobile terminal 500 may obtain the partial image of the region to be zoomed in by using a coordinate value of a zoom-in region included in the zoom-in mode request message. The mobile terminal 500 may obtain data of a zoomed-in partial image of the obtained partial image and transmit the data to the display device 100. The data of the zoomed-in partial image may be data of a state in which the resolution of the original image is maintained.

After that, the mobile terminal 500 may transmit the data of the zoomed-in partial image 1210 of the image corresponding to the zoom-in region to the display device 100 together with the data of the entire image 810.

The display device 100 may display, on the display unit 180, the entire image 810 based on the received data of the zoomed-in partial image 1210 and the zoomed-in partial image 1210 based on the data of the zoomed-in partial image 1210.

Referring to FIG. 12, the display device 100 may move the entire image 810 to a region 1201 where the existing first letter box 820 is displayed. Simultaneously, the display device 100 may display the zoomed-in partial image 1210 on the other region 1203 of the display unit 180.

An example in which the entire image 810 is moved left from the center has been described with reference to FIG. 12, but this is merely an example. The entire image 810 may be moved right from the center.

On the other hand, the zoom-in mode request message transmitted by the display device 100 may include location information of the zoom-in region 811 to be zoomed in the entire image 810. The mobile terminal 500 may use the location information of the zoom-in region 811 later so as to transmit, to the display device 100, the mage of the state in which the partial image corresponding to the zoom-in region is zoomed in.

The location information corresponding to the zoom-in region 811 will be described below with reference to FIG. 13.

Referring to FIG. 13, the zoom-in region 811 around the pointer 900 having the magnifier shape is illustrated. The zoom-in region 811 may have a rectangular shape, but this is merely an example. The zoom-in region 811 may have various shapes such as a circular shape or an oval shape.

In FIG. 13, it is assumed that the zoom-in region 811 has a rectangular shape.

The display device 100 may obtain coordinates O of the pointer 900 displayed on the entire image 810. Additionally, it is possible to obtain coordinates of each vertex of the rectangular zoom-in region 811 around the coordinates O of the pointer 900.

That is, the display device 100 may obtain location information including coordinates A(x+w, y+h) of the first vertex of the zoom-in region 811, coordinates B(x−w, y+h) of the second vertex thereof, third coordinates C(x−w, y−h) of the third vertex thereof, and fourth coordinates D(x+w, y−h) of the fourth vertex thereof.

The display device 100 may transmit the obtained location information of the zoom-in region 811 to the mobile terminal 500.

The mobile terminal 500 may convert the coordinates of each vertex included in the location information of the zoom-in region 811 according to a screen ratio thereof. The mobile terminal 500 may obtain a partial image corresponding to the zoom-in region 811 by using the converted coordinates of each vertex.

Then, the mobile terminal 500 may obtain data of the zoomed-in partial image having the same resolution as the original image based on the obtained data of the partial image.

Referring to FIG. 14, the mobile terminal 500 may transmit the entire image 810 and the zoomed-in partial image 1210 to the display device 100 according to the received zoom-in mode request message.

Since the mobile terminal 500 provides the entire image 810 and the zoomed-in partial image 1201 having no degradation in image quality, the display device 100 may display the original image and the zoomed-in partial image of the original image without performing the scaling process.

The user can view a clear image of a region that he or she wants to zoom in.

Additionally, the user can view a zoomed-in partial image instead of an unnecessary block region such as a letter box.

Additionally, the user can view desired information in a large size and clearly through a large screen of the WFD sink 20, as compared to a relatively small WFD source 10.

Figure 15:
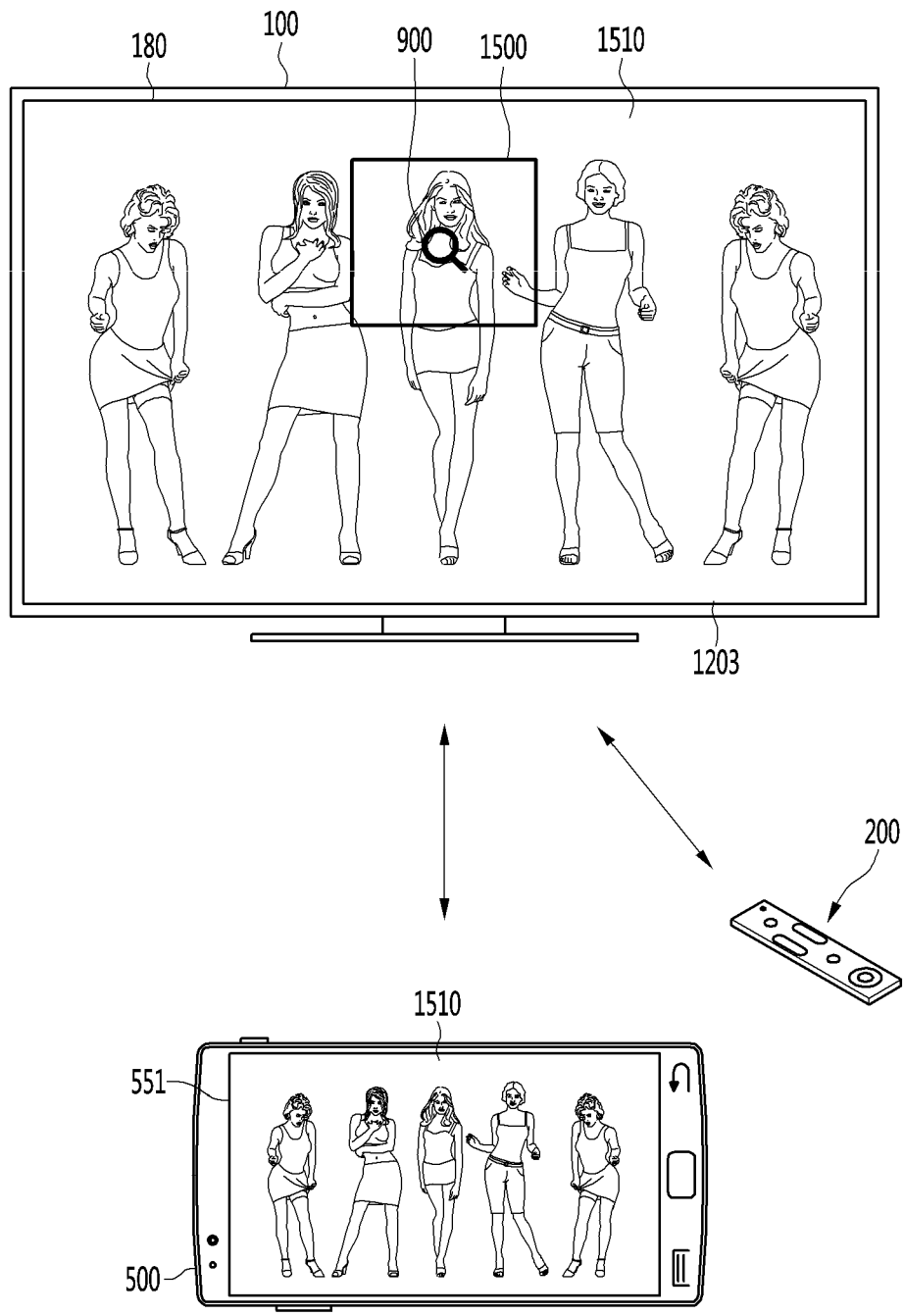
FIGS. 15 to 17 are views illustrating a process of performing a magic zoom function during screen sharing between a WFD source and a WFD sink according to further another embodiment of the present invention.
Figure 16:
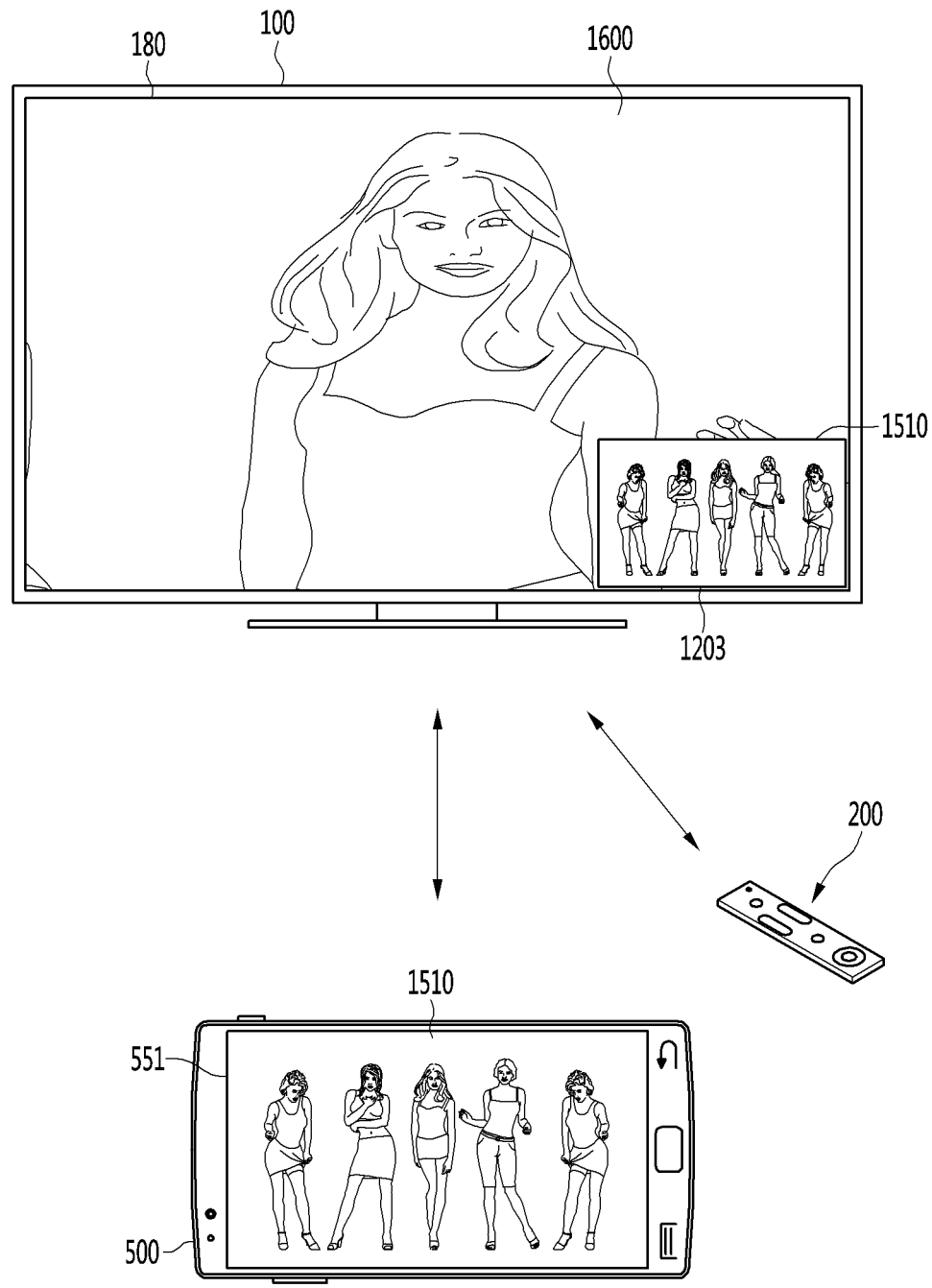
Figure 17:
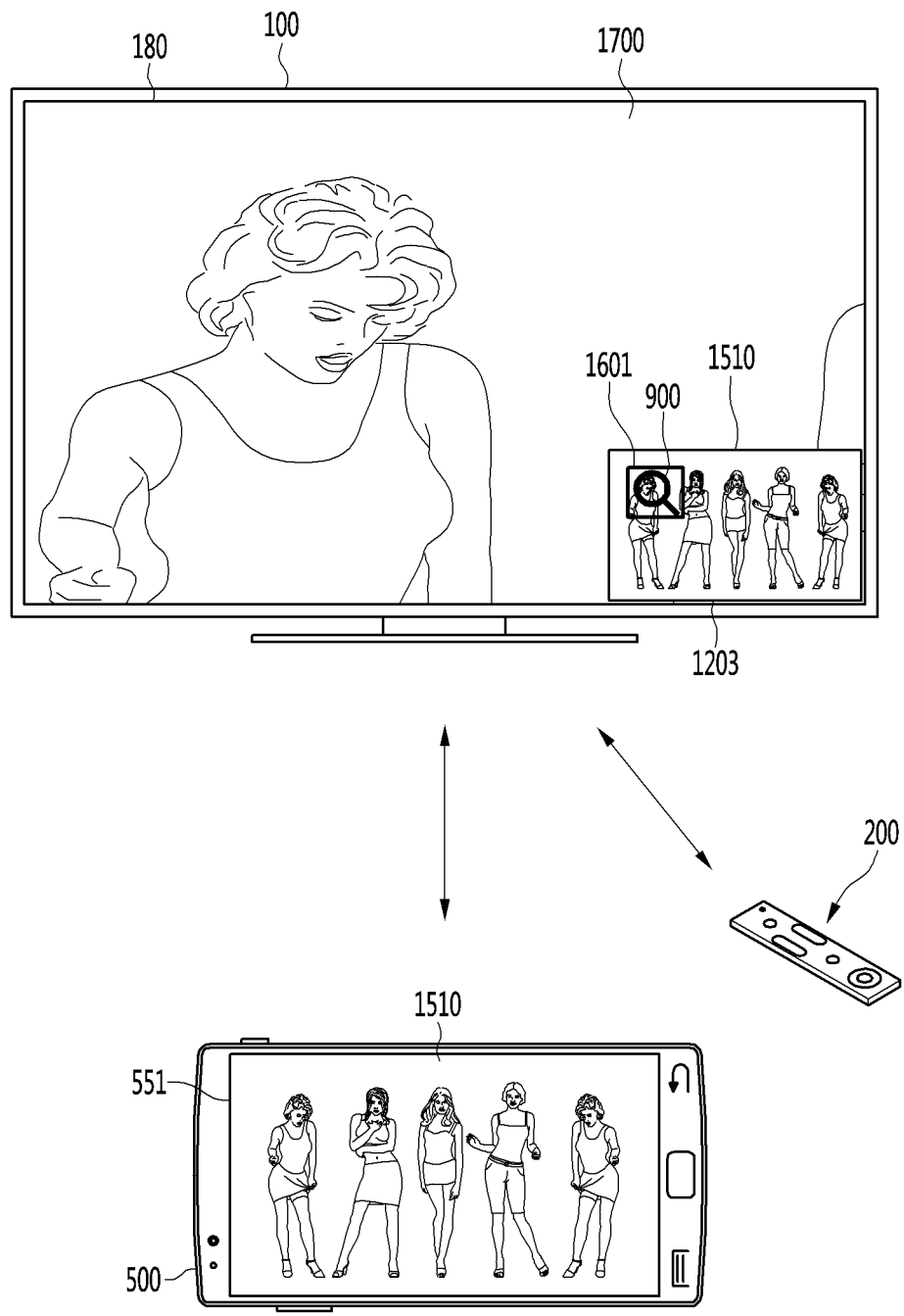

FIGS. 15 to 17 are views illustrating a process of performing a magic zoom function during screen sharing between a WFD source and a WFD sink according to further another embodiment of the present invention.

In particular, FIGS. 15 and 17 illustrate an embodiment in which the mobile terminal 500 is in a landscape mode (horizontal mode).

The mobile terminal 500 displays an entire image 1510 of media content in a landscape mode. The display device 100 displays a pointer 900 and the entire image 1510 of the media content received from the mobile terminal 500.

When the mobile terminal 500 is in a landscape mode, the display device 100 may not display a letter boxy, unlike in the case where the mobile terminal 500 is in a portrait mode.

In this case, the display device 100 may receive a zoom-in request signal from the remote control device 200.

The display device 100 may obtain location information of a zoom-in region 1500 corresponding to a point where the pointer 900 is located. The display device 100 may transmit a zoom-in mode request message including the obtained location information of the zoom-in region 1500 to the mobile terminal 500.

The mobile terminal 500 may obtain a partial image to be zoomed in from the entire image 1510, based on the location information of the zoom-in region 1500 included in the received zoom-in mode request message.

The mobile terminal 500 may obtain data of a zoomed-in partial image corresponding to the partial image and transmit the obtained data to the display device 100 together with data of the entire image 1510.

Referring to FIG. 16, the display device 100 may display the zoomed-in partial image 1600 corresponding to the zoom-in region 1500 on the main screen of the display unit 180 and display the existing displayed entire image 1510 on the sub screen of the display unit 180.

The main screen may be an entire screen of the display unit 180, and the sub screen may be a partial screen of the display unit 180. That is, the entire image 1510 may be zoomed out.

On the other hand, when the pointer 900 is located on the entire image 1510 displayed on the sub screen, the display device 100 may display, on the main screen, a zoomed-in partial image 1700 corresponding to a region 1601 corresponding to a point where the pointer 900 is located.

In the state of FIG. 16, when the pointer 900 is located on a certain point of the entire image 1510 displayed on the sub screen, the display device 100 may display, on the main screen, a zoomed-in partial image 1700 corresponding to a region 1601 corresponding to a point where the pointer 900 is located, as shown in FIG. 17.

The display device 100 may transmit, to the mobile terminal 500, location information of the region 1601 corresponding to the point where the pointer 900 is located and may receive, from the mobile terminal 500, data of the zoomed-in partial image 1700 corresponding to the region 1601.

Even when the mobile terminal 500 is in the landscape mode, the user can view a zoomed-in image of a desired region through the entire image 1510 displayed on the sub screen.

Figure 18:
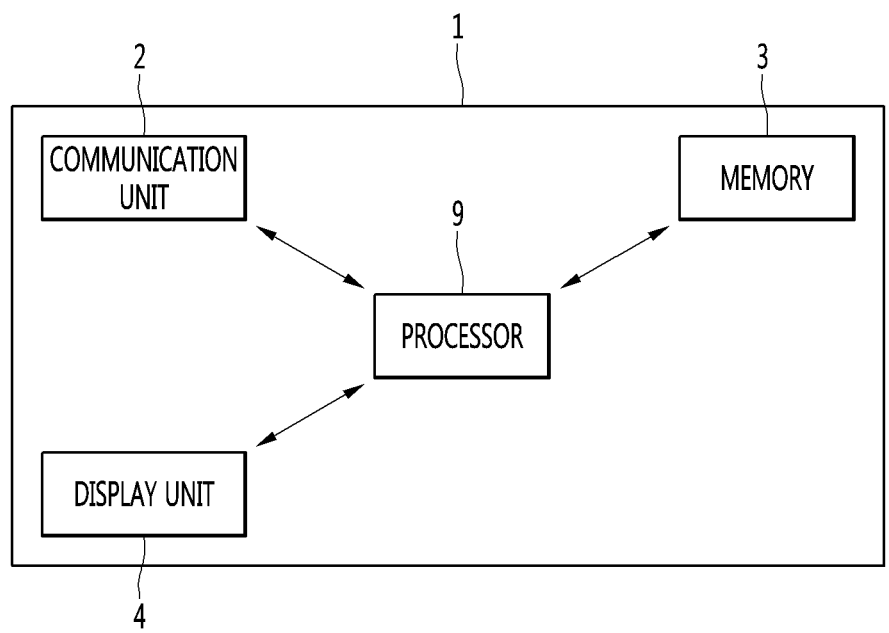
FIG. 18 is a block diagram illustrating a configuration of a wireless device according to an embodiment of the present invention.

FIG. 18 is a block diagram illustrating a configuration of a wireless device according to an embodiment of the present invention.

The wireless device shown in FIG. 18 may be one of the WFD source 10 and the WFD sink 20 described above.

Referring to FIG. 18, the wireless device 1 may include a communication unit 2, a memory 3, a display unit 4, and a processor 9.

The communication unit 2 may transmit and receive a wireless signal and may implement, for example, a physical layer based on an IEEE 802 system. The communication unit 2 may be referred to as a transceiver.

The processor 9 may control operations of the communication unit 2, the memory 3, and the display unit 4. The processor 9 may be electrically connected to the communication unit 2 to implement a physical layer and/or a MAC layer based on the IEEE 802 system. Additionally, the processor 9 may be configured to perform encoding and decoding operations of audio and video for a WFD service. Additionally, modules that implement operations of wireless devices according to various embodiments of the present invention may be stored in the memory 3 and may be performed by the processor 9. The memory 3 may be included in the processor 9 or may be installed outside the processor 9 and connected to the processor 9 by a known means. Although not shown, the wireless device 1 may further include a sound output unit configured to output a sound.

When the wireless device 1 is the WFD source 10, the WFD source 10 may include the entire configuration of the mobile terminal 500 shown in FIG. 5. In this case, the communication unit 2 of the wireless device 1 may perform all the functions of the wireless communication unit 510. In particular, the communication unit 2 may include all the functions of the short-range communication module 514 included in the wireless communication unit 510. Additionally, the memory 3 of the wireless device 1 may correspond to the memory unit 570 of FIG. 5, and the display unit 4 may correspond to the display unit 551 of FIG. 5. Additionally, the processor 9 may perform all the functions of the control unit 580 of FIG. 5.

When the wireless device 1 is the WFD sink 20, the WFD sink 20 may include the entire configuration of the display device 100 shown in FIG. 1. In this case, the communication unit 2 of the wireless device 1 may correspond to the wireless communication unit 173 of FIG. 1, the memory 3 of the wireless device 1 may correspond to the storage unit 140 of FIG. 1, the display unit 4 of the wireless device 1 may correspond to the display unit 180 of FIG. 1, and the processor 9 of the wireless device 1 may correspond to the control unit 170.

According to further another embodiment of the present invention, the WFD sink 20 may or may not remove a black image from the entire image being received from the WFD source 10 through a setup of a black image removal mode. For example, the WFD sink 20 may display a menu setup screen for setting the black image removal mode and may set whether to remove the black image through the menu setup screen.

The embodiments of the present invention can be supported by standard documents disclosed in at least one of an IEEE 802 system, a 3GPP LTE and LTE-A (LTE-Advanced) system, a 3GPP2 system, and a Wi-Fi Alliance (WFA) system, which are wireless access systems. That is, the steps or parts, which are not explained to clearly reveal the technical idea of the present invention, in the embodiments of the present invention can be supported by the above documents. Moreover, all terminologies disclosed in this document can be supported by the standard documents.

According to an embodiment, the above-described method may also be embodied as processor-readable codes on a program-recordable medium. Examples of the processor-readable medium may include a ROM, a RAM, a CD-ROM, a magnetic tape, a floppy disk, and an optical data storage device.

The above-described display device is not limited to the configuration and method of the above-described embodiments, and some or all of the embodiments may also be selectively combined and configured to provide various modifications.

What is claimed is:

1. A display device comprising:
a display configured to display information;
a hardware communication unit configured to perform wireless communication with an external device; and
a processor configured to:
control the display to display a letterbox adjacent to a content image being displayed at the external device, the content image received from the external device via the hardware communication unit;
receive a zoom-in signal for zooming-in to a partial region of the displayed content image;
transmit a zoom-in request message to the external device;
according to the transmitted zoom-in request message receive the entire content image and a zoomed-in image corresponding to the partial region from the external device via the hardware communication unit; and
display the entire image at a region where the letterbox was displayed and display the zoomed-in image on a remaining region of the display.

2. The display device of claim 1, wherein the processor is further configured to control the display to concurrently display the entire content image at a first region of the display and the zoomed-in image at a second region of the display.

3. The display device of claim 1, wherein:
the processor is further configured to control the display to display a pointer corresponding to a remote control device; and
the zoom-in signal is a signal for zooming-in to the partial region corresponding to a location of the pointer within the displayed content image.

4. The display device of claim 3, wherein the zoom-in request message comprises location information of the partial region.

5. The display device of claim 4, wherein the location information of the partial region includes coordinates of the pointer within the content image and coordinates of the partial region.

6. The display device of claim 2, wherein when the content image is displayed at the external device in a portrait orientation:
the content image is displayed on the display in a letterboxed format wherein a first letterbox is displayed at a left side of the displayed content image and a second letterbox is displayed at a right side of the displayed content image; and
the first region corresponds to a location where the first letterbox was displayed and the second region corresponds to a remainder area of the display other than the first region.

7. The display device of claim 2, wherein when the content image is displayed at the external device in a landscape orientation, the second region corresponds to an entire area of the display and the first region corresponds to a windowed area within the second region.

8. The display device of claim 7, wherein the processor is further configured to control the display to display a different zoomed-in image at the second region to correspond to movement of a pointer corresponding to a remote control device, wherein the pointer is displayed and moved within the entire content image displayed at the first region.

9. A system for wirelessly displaying content, the system comprising:
a first display device configured to:
display a letterbox adjacent to a content image being displayed at a second display device of the system;
receive a zoom-in signal for zooming-in to a partial region of the displayed content image;
transmit a zoom-in request message to the second display device;
receive the entire content image and a zoomed-in image corresponding to the partial region from the second display device in response to the transmitted zoom-in request message; and
display the entire image at a region where the letterbox was displayed and display the zoomed-in image on a remaining region of the display, wherein the second display device is configured to:
display the content image;
receive the zoom-in request message from the first display device;
transmit the entire content image and the zoomed-in image to the first display device in response to the zoom-in request message.

10. The system of claim 9, wherein the first display device is further configured to concurrently display the entire content image at a first region of a display of the first display device and the zoomed-in image at a second region of the display of the first display device.

11. The system of claim 9, wherein:
the first display device is further configured to display a pointer corresponding to a remote control device; and
the zoom-in signal is a signal for zooming-in to the partial region corresponding to a location of the pointer within the displayed content image at the first display device.

12. The system of claim 11, wherein:
the zoom-in request message comprises location information of the partial region; and
the second display device is further configured to obtain data of the partial image based on the location information.

13. The system of claim 12, wherein the location information of the partial region includes coordinates of the pointer within the content image and coordinates of the partial region.

14. The system of claim 10, wherein when the content image is displayed at the second display device in a portrait orientation:
the content image is displayed at the first display device in a letterboxed format wherein a first letterbox is displayed at a left side of the displayed content image and a second letterbox is displayed at a right side of the displayed content image; and
the first region corresponds to a location where the first letterbox was displayed and the second region corresponds to a remainder area of the display of the first display device other than the first region.

15. The system of claim 10, wherein when the content image is displayed at the second display device in a landscape orientation, the second region corresponds to an entire area of the display of the first display device and the first region corresponds to a windowed area within the second region.

* * * * *